(12) United States Patent
Mori

(10) Patent No.: US 9,143,761 B2
(45) Date of Patent: Sep. 22, 2015

(54) IMAGE PROCESSING DEVICE, IMAGE PROCESSING METHOD, RECORDING MEDIUM, AND IMAGING DEVICE

(71) Applicant: FUJIFILM Corporation, Tokyo (JP)

(72) Inventor: Koji Mori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/228,835

(22) Filed: Mar. 28, 2014

(65) Prior Publication Data

US 2014/0210956 A1 Jul. 31, 2014

Related U.S. Application Data

(63) Continuation of application No. PCT/JP2012/072414, filed on Sep. 4, 2012.

(30) Foreign Application Priority Data

Sep. 29, 2011 (JP) ................. 2011-215053

(51) Int. Cl.
  *H04N 13/02* (2006.01)
  *H04N 13/00* (2006.01)
  *G03B 17/20* (2006.01)
  *G03B 35/08* (2006.01)

(52) U.S. Cl.
  CPC ............ *H04N 13/0221* (2013.01); *G03B 17/20* (2013.01); *H04N 13/0018* (2013.01); *H04N 13/0022* (2013.01); *H04N 13/0033* (2013.01); *G03B 35/08* (2013.01)

(58) Field of Classification Search
  None
  See application file for complete search history.

(56) References Cited

U.S. PATENT DOCUMENTS

2009/0046924 A1* 2/2009 Morimitsu .................... 382/154
2012/0069159 A1   3/2012 Matsui et al.
2012/0249746 A1* 10/2012 Cornog et al. ................. 348/47

FOREIGN PATENT DOCUMENTS

| JP | 2005-142819 A | 6/2005 |
| JP | 2006-287967 A | 10/2006 |
| JP | 2010/177921 A | 8/2010 |
| JP | 2011-33990 A | 2/2011 |
| JP | 2011-171813 A | 9/2011 |
| WO | WO 2010/150554 A1 | 12/2010 |

OTHER PUBLICATIONS

International Preliminary Report on Patentability, issued in PCT/JP2012/072414, dated Aug. 16, 2013.
International Search Report, issued in PCT/JP2012/072414, dated Dec. 11, 2012.
Written Opinion of the International Searching Authority, issued in PCT/JP2012/072414, dated Dec. 11, 2012.

* cited by examiner

*Primary Examiner* — Tung Vo
*Assistant Examiner* — Joseph Becker
(74) *Attorney, Agent, or Firm* — Birch, Stewart, Kolasch & Birch, LLP

(57) ABSTRACT

An image processing device comprising: an image acquisition unit; a display unit; a selection unit; a parallax acquisition unit; a parallax history information generator that generates continuously parallax history information on the basis of the parallax acquired by the parallax acquisition unit, the parallax history information indicating variation with time of the parallax for the specific subject image and including a current parallax for the specific subject image; and a controller that displays on the display unit the plural viewpoint images of the moving image acquired by the image acquisition unit together with the parallax history information generated by the parallax history information generator, the controller making the display cycle of displaying the parallax history longer than the cycle of acquiring the parallax by the parallax acquisition unit.

8 Claims, 19 Drawing Sheets

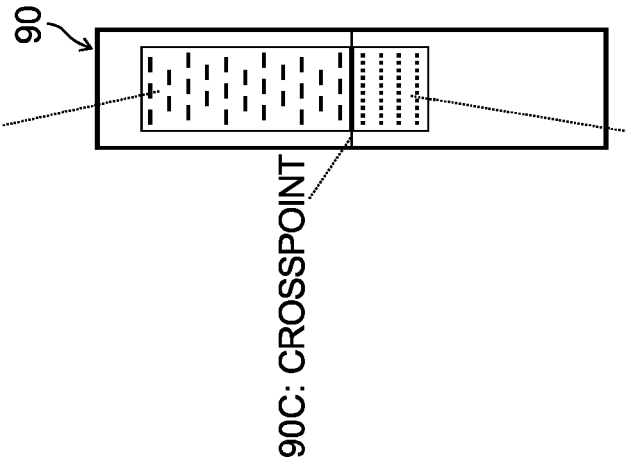
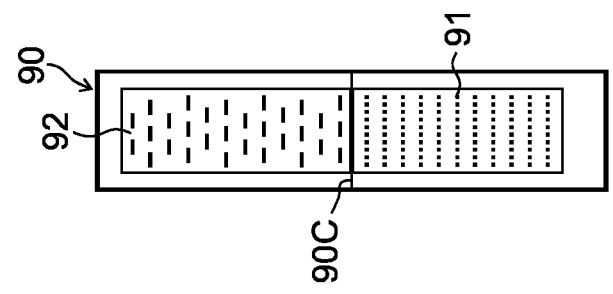
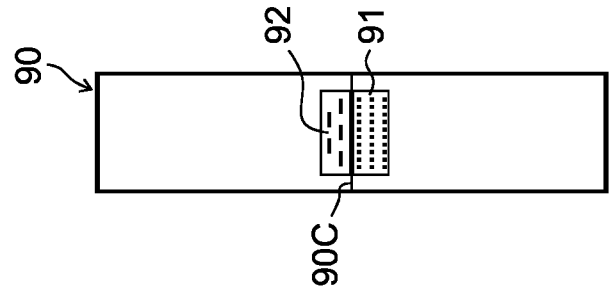

FIG.8A MARKING TARGET NUMBER : 2
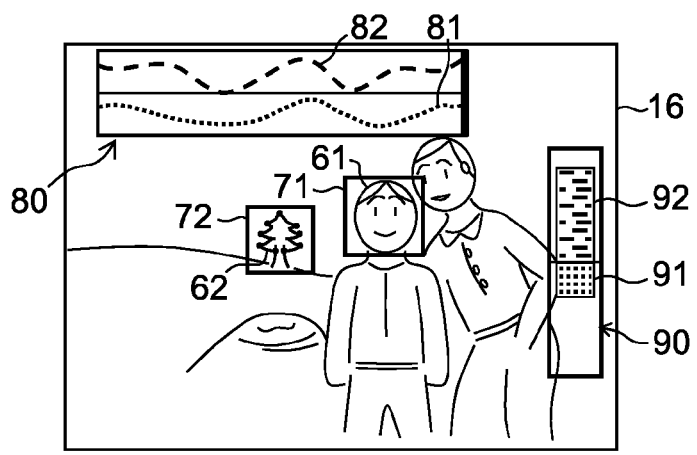
FIG.8B MARKING TARGET NUMBER : 4
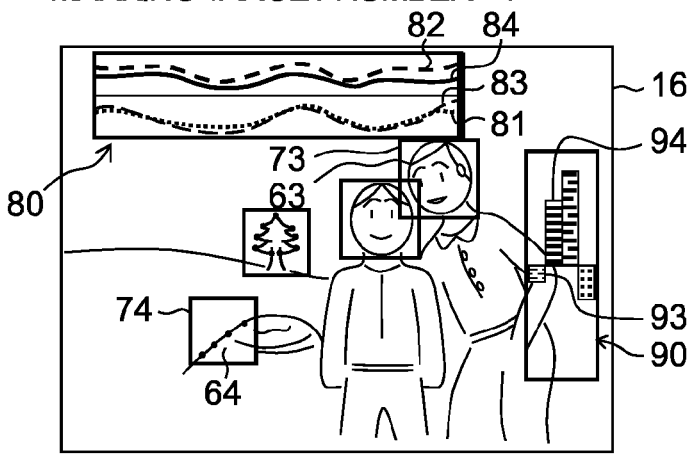
FIG.8C MARKING TARGET NUMBER : 1
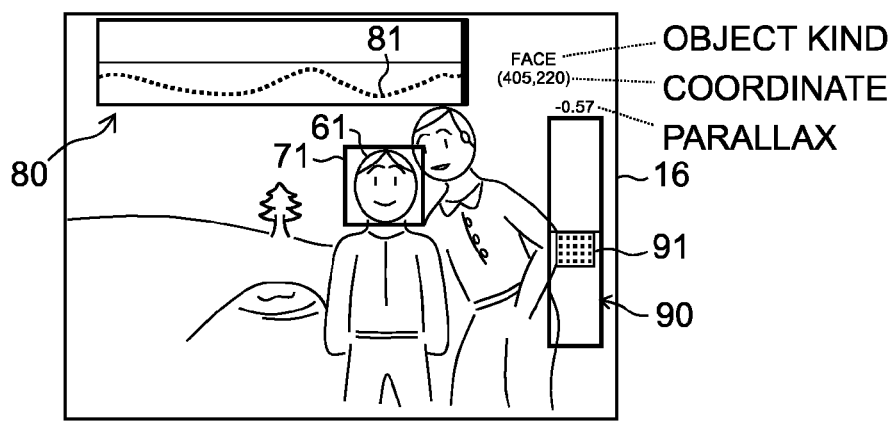

IMAGE PROCESSING DEVICE, IMAGE PROCESSING METHOD, RECORDING MEDIUM, AND IMAGING DEVICE

CROSS-REFERENCE TO RELATED APPLICATIONS

This application is a continuation application and claims the priority benefit under 35 U.S.C. §120 of PCT Application No. PCT/JP2012/072414 filed on Sep. 4, 2012 which application designates the U.S., and also claims the priority benefit under 35 U.S.C. §119 of Japanese Patent Application No. 2011-215053 filed on Sep. 29, 2011, which applications are all hereby incorporated by reference in their entireties.

BACKGROUND OF THE INVENTION

1. Field of the Invention

The present invention relates to an image processing device capable of assisting parallax adjustment for a user such that the user easily grasps parallax variation, an image processing method, a program, a recording medium, and an imaging device.

2. Description of the Related Art

A device has been in widespread use which can take or display an image that is stereoscopically viewable.

Japanese Patent Application Laid-Open No. 2011-33990 discloses a configuration in which a parallax amount of a subject image is detected, and if the parallax amount falls within a stereoscopically viewable range, stereoscopic imaging is automatically performed.

Japanese Patent Application Laid-Open No. 2006-287967 discloses a configuration in which depth distribution information in a screen is extracted from an image to perform a special effect processing such as feathering on portions that are not at a certain distance.

Japanese Patent Application Laid-Open No. 2010-177921 discloses a configuration in which a projection amount of a subject is superimposed on an image for display.

SUMMARY OF THE INVENTION

Parallax adjustment can be performed on a subject image in a moving image by performing image processing on the moving image depending on a user operation while the moving image is stereoscopically viewable. However, a problem is that it is difficult for the user to perceive to which side of a protruding side (hereinafter, also referred to as "convex side") or a retracting side (hereinafter, also referred to as "concave side") and to what degree the user is moving the subject image in the moving image with respect to a depth direction.

For example, in a case where the subject image is being moved to the convex side or the concave side with respect to the depth direction depending on a user button operation, the user tries to confirm a parallax adjustment amount corresponding to a button operation amount by stereoscopically viewing the subject image in the moving image. In this case, the user may not actually perceive to which side of the convex side or the concave side and to what degree the parallax varies depending on the button operation amount.

Moreover, in imaging a stereoscopic moving image, the parallax varies even when the imaging device or the subject moves. In other words, even if the user does not carry out a parallax adjustment operation, a similar problem exists.

Further, another problem is that the user does not easily know on what basis the parallax is to be adjusted.

An object of the present invention, which has been made in consideration of such a circumstance, is to provide an image processing device which allows the user to easily grasp the parallax variation, an image processing method, a program, a recording medium and an imaging device.

In order to achieve the object, an image processing device according to an aspect of the present invention includes an image acquisition unit that acquires a moving image including plural viewpoint images continuously taken, a display unit that displays the moving image acquired by the image acquisition unit, a selection unit that selects a specific subject image from the moving image acquired by the image acquisition unit, a parallax acquisition unit that continuously acquires a parallax for the specific subject image selected by the selection unit from the plural viewpoint images of the moving image, a parallax history information generator that continuously generates parallax history information on the basis of the parallax acquired by the parallax acquisition unit, the parallax history information indicating variation with time of the parallax for the specific subject image and including a current parallax for the specific subject image, and a controller that displays on the display unit the plural viewpoint images of the moving image acquired by the image acquisition unit together with the parallax history information generated by the parallax history information generator. Note that displaying the moving image on the display unit is not specifically limited to a case where the image is three-dimensionally displayed (stereoscopic viewing-display), and includes a case where the image is two-dimensionally displayed (plane-display).

According to the configuration, the parallax history information indicating variation with time of the parallax for the specific subject image and including the current parallax for the specific subject image is continuously generated. Then, the parallax history information is displayed together with the plural viewpoint images of the moving image. Therefore, the user observes the current parallax and the parallax of the past in the parallax history information displayed together with the moving image in real time such that the user can easily grasp the variation with time of the parallax for the subject image.

According to an aspect above, an image processor is further included that performs marking to give a mark for each specific subject image in the moving image, and the parallax history information generator may generate the parallax history information indicating the variation of the parallax visually associated with the mark for each specific subject image. In other words, the user can easily relate the marked subject image to the parallax variation in the parallax history information to be observed, allowing the user to more easily grasp the variation with time of the parallax.

According to an aspect above, the parallax history information generator may generate as the parallax history information a graph indicating parallax variation for the specific subject image using a line having a color or pattern which is the same as the mark for each specific subject image. In other words, owing to the color or pattern the user can more easily relate to the subject image to the parallax variation in the parallax history information to be observed.

According to an aspect above, the mark given to the specific subject image by the image processor may be a frame image surrounding the specific subject image.

According to an aspect above, a marking target instruction input unit may further be included that accepts an instruction input for the number of subject images of marking target, and the parallax history information generator may generate the parallax history information indicating the variation with time of the parallax for the subject image of marking target, the number of pieces of the parallax history information being the same as the number of the subject images of marking target instructed by the marking target number instruction input unit, and the image processor may give the mark to the subject image of marking target, the number of the marks being the same as the number of the subject images of marking target instructed by the marking target number instruction input unit, and may switch the number of the marks in response to the number of the subject images of marking target being switched when the marking target number instruction input unit switches the number of the subject images of marking target. In other words, if the marking target number is increased, the parallax variation of many subject images can be confirmed in a form of list. Moreover, when the marking target number is one, one subject image may be focused on to observe the parallax variation.

According to an aspect above, a marking target instruction input unit may further be included that accepts an instruction input indicating the subject image of marking target of the subject images in the moving image, and the parallax history information generator may generate the parallax history information indicating variation with time of the parallax for the subject image of marking target, and the image processor may give the mark to the subject image of marking target instructed by the marking target number instruction input unit, and may switch a destination to which the mark is given in response to the subject image of marking target being switched when the subject image of marking target is switched by the marking target instruction input unit. In other words, the marking target can be changed to any subject image.

According to an aspect above, when the subject image of marking target is changed according to the instruction input from the marking target instruction input unit, the parallax history information generator may generate the parallax history information indicating the variation with time of the parallax for the subject image of marking target before change until a time of the change as well as indicating the variation with time of the parallax for the subject image of marking target after the change from the time of the change. In other words, the user can be notified of that the marking target is changed to easily grasp a difference in the parallax before and after the change.

According to an aspect above, a tracking unit may further be included that tracks the specific subject image in the moving image, and the parallax acquisition unit may acquire the parallax for the specific subject image in the moving image tracked by the tracking unit.

According to an aspect above, in a case where an operation is performed concerning the parallax in the moving image, the parallax history information generator may add information indicating a timing of the operation concerning the parallax in the moving image to the parallax history information. In other words, it is possible to grasp what operation leads to what parallax variation.

According to an aspect above, the parallax history information generator may generate the parallax history information presenting a parallax range suitable to stereoscopic viewing. In other words, an effective parallax adjustment assist is possible.

According to an aspect above, the parallax history information generator may generate the parallax history information presenting a parallax range unsuitable to stereoscopic viewing. In other words, the user may be led not to take or display an image in the parallax range unsuitable to stereoscopic viewing, which can prevent the user from feeling discomfort due to the stereoscopic image display.

According to an aspect above, in a case where the selection unit selects plural specific subject images, the parallax history information generator may generate the parallax history information for the nearest subject image or the farthest subject image among the plural specific subject images, or for both these subject images.

According to an aspect above, a parallax gauge generator may further be included that generates a parallax gauge including a parallax bar indicating the current parallax for the specific subject image included in the plural viewpoint images of the moving image, the parallax gauge representing a positive or negative sign of the parallax in terms of a displacement direction of the parallax bar and representing a magnitude of the parallax in terms of a length of the parallax bar, and the image processor may superimpose the parallax gauge together with the parallax amount history information on the moving image, in which at least one of the displacement direction or the length of the parallax bar of the parallax gauge varies depending on the variation with time of at least one of the positive or negative sign and the magnitude of the parallax for the specific subject image on the display unit. This also allows the user to grasp the parallax variation by means of displacement of the parallax bar.

An image processing method according to an aspect of the present invention is an image processing method performed by use of an image acquisition unit that acquires a moving image including plural viewpoint images continuously taken and a display unit that displays the moving image acquired by the image acquisition unit, the method includes a step of selecting a specific subject image from the moving image acquired by the image acquisition unit, a parallax acquisition step of continuously acquiring a parallax for the selected specific subject image from the plural viewpoint images of the moving image, a parallax history information generation step of continuously generating parallax history information on the basis of the parallax acquired in the parallax acquisition step, the parallax history information indicating variation with time of the parallax for the specific subject image and including a current parallax for the specific subject image, and a display step of displaying on the display unit the plural viewpoint images of the moving image acquired by the image acquisition unit together with the parallax history information generated in the parallax history information generation step.

Moreover, a program according to an aspect of the present invention causes a computer device to execute the image processing method.

Further, an imaging device according to an aspect of the present invention includes an image processing device, and the image acquisition unit includes an imaging unit that images a subject.

According to the present invention, the user is allowed to easily grasp the parallax variation.

BRIEF DESCRIPTION OF THE DRAWINGS

FIG. 6A is an enlarged view of the parallax gauge in FIG. 4 on an enlarged scale.

FIG. 6B is an enlarged view illustrating the parallax gauge when a parallax amount is large on both a concave side and a convex side.

FIG. 6C is an enlarged view illustrating the parallax gauge when the parallax amount is small on both the concave side and the convex side.

FIG. 8A is an explanatory diagram illustrating a display example of a moving image in a second embodiment (in a case where the number of marking targets is two).

FIG. 8B is an explanatory diagram illustrating a display example of the moving image in the second embodiment (in a case where the number of marking targets is four).

FIG. 8C is an explanatory diagram illustrating a display example of the moving image in the second embodiment (in a case where the number of marking targets is one)

DETAILED DESCRIPTION OF THE PREFERRED EMBODIMENTS

Hereinafter, a description is given in detail of embodiments of the present invention in accordance with accompanying drawings.

Figure 1:
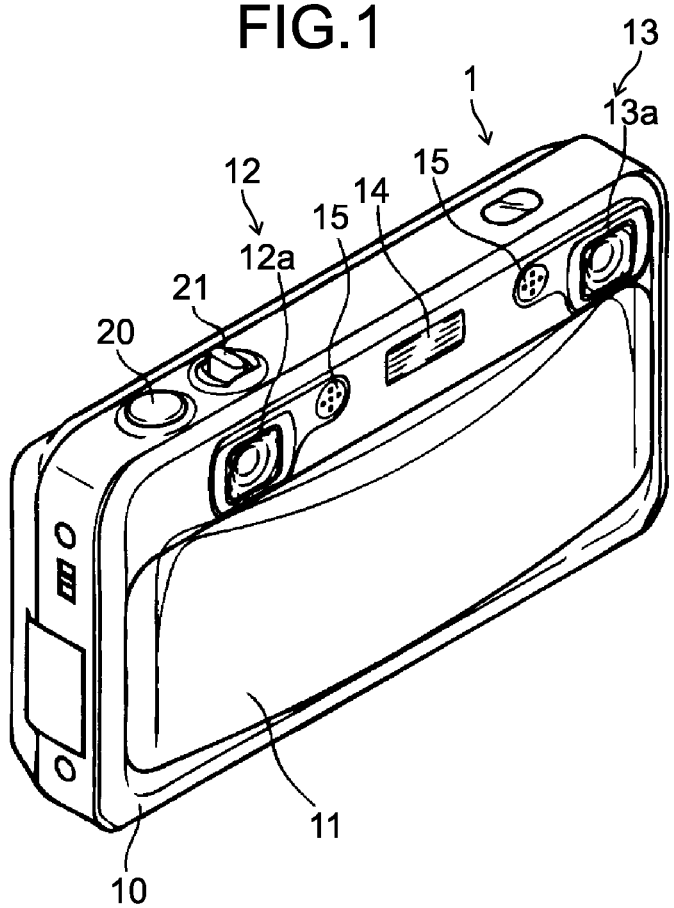
FIG. 1 is a front perspective view of a stereoscopic imaging device of an application example of an image processing device according to an embodiment of the present invention.
Figure 2:
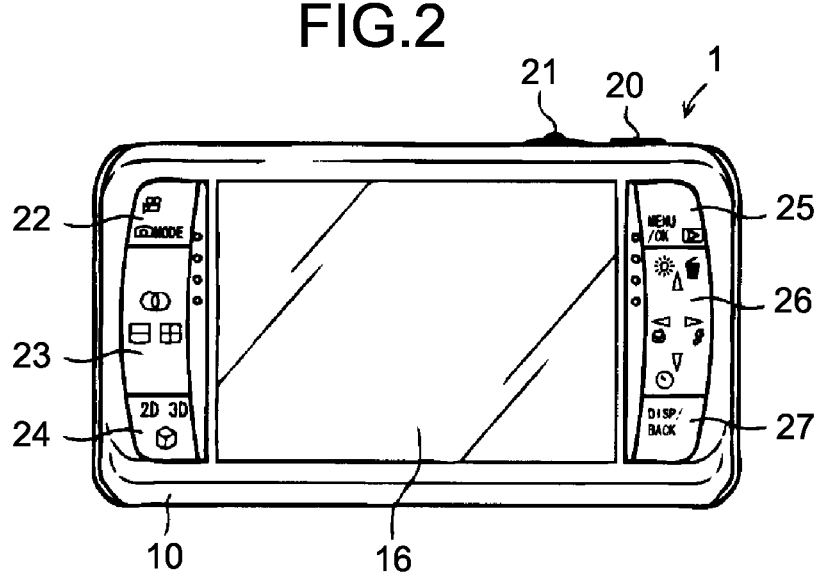
FIG. 2 is a back view of the stereoscopic imaging device in FIG. 1.

FIG. 1 is a front perspective view of a stereoscopic imaging device 1 as an application example of an image processing device according to an embodiment of the present invention, and FIG. 2 is a back view thereof.

As shown in FIG. 1, provided on a front surface of a main body 10 of the stereoscopic imaging device 1 are a barrier 11, right and left imaging units 12 and 13, a flash 14, and a microphone 15. Moreover, provided on a top surface of the main body of the stereoscopic imaging device 1 are a release switch 20, and zoom button 21.

As shown in FIG. 2, provided on a back surface of the main body 10 of the stereoscopic imaging device 1 are a display unit 16, mode button 22, parallax adjustment button 23, 3D/2D switching button 24, MENU/OK button 25, cross button 26, and DISP/BACK button 27.

The barrier 11 is slidably attached to the front surface of the main body 10. Up and down slide of the barrier 11 allows switching between an open state and a close state.

The right imaging unit 12 taking an image for right eye (right viewpoint image) and the left imaging unit 13 taking an image for left eye (left viewpoint image) acquire two viewpoint images obtained by imaging the same subject from two viewpoints. The right imaging unit 12 and the left imaging unit 13 are each an optical unit including an image-taking lens group, diaphragm and imaging element. The image-taking lens groups of the right imaging unit 12 and left imaging unit 13 include object lenses 12a and 13a taking in a light from a subject, a prism approximately vertically bending light paths incident from the object lenses 12a and 13a, a zoom lens and a focus lens.

The flash 14 illuminates the subject with a flash light, and flashes the light as needed when imaging a dark subject, taking an image against a light or the like.

The display unit 16 is a display device capable of displaying in color both three-dimensional display for a stereoscopic image (hereinafter, also referred to as "3D-display" or "stereoscopic viewing-display") and two-dimensional display for a planar image (hereinafter, also referred to as "2D-display" or "plane-display"). The display unit 16 in this example has a touch sensor and can be also used as an instruction input device (operation unit) in making various instruction inputs.

The display unit 16 may employ any of a parallax barrier, lenticular method, integral photography method using microlens array sheet, holography method using an interference phenomenon. In addition, the display unit 16 may employ any of a crystal liquid display device, organic EL (electroluminescence) display device and the like.

The release switch 20 includes a two-stage stroke-type switch including so-called "half press" and "full press". When the release switch 20 is half-pressed, performed is imaging preparation processing, i.e., each of AE (Automatic Exposure) processing, AF (Auto Focus) processing, and AWB (Automatic White Balance) processing. Image recording processing is performed when the release switch 20 is full-pressed. In taking a moving image (e.g., when a moving image taking mode is selected by the mode button 22, or the moving image taking mode is selected from a menu), taking the moving image is started when the release switch 20 is full-pressed, and the taking the moving image ends when the release switch 20 is full-pressed again.

The zoom button 21 is used for a zoom operation of the right imaging unit 12 and left imaging unit 13. The zoom button 21 includes a zoom tele button for making an instruction to perform zooming to a telephoto side and a zoom wide button for making an instruction to perform zooming to a wide-angle side.

The mode button 22 functions as mode setting instruction input means for instruction input of setting an image taking mode and reproduction mode. The image taking mode is a mode for imaging the subject and recording an image. The reproduction mode is a mode for reproduction-displaying the recorded image. As the "image taking mode", a "moving image taking mode" for taking a moving image and a "still image taking mode" for taking a still image are used in this example. The instruction input for setting any of the "moving image taking mode" and the "still image taking mode" is carried out by the mode button 22.

The parallax adjustment button 23 is a button for electronically adjusting the parallax for the subject image in performing stereoscopic viewing-display (in taking, and reproduction-displaying a stereoscopic image). If the parallax adjustment button 23 is pushed down on the right side, the parallax between an image taken by the right imaging unit 12 and an image taken by the left imaging unit 13 is varied by a predetermined increment from the concave side to the convex side. If the parallax adjustment button 23 is pushed down on the left side, the parallax between an image taken by the right imaging unit 12 and an image taken by left imaging unit 13 is varied by a predetermined increment from the convex side to the concave side.

The 3D/2D switching button 24 functions as instruction input means for instruction input of switching between a 3D mode and a 2D mode. Specifically, in a state where the image taking mode (moving image taking mode or still image taking mode) is set by use of the mode button 22, the mode is switched by the 3D/2D switching button 24 between a "3D image taking mode" for taking a multi-viewpoint image and a "2D image taking mode" for taking a single-viewpoint image (specifically, "3D moving image taking mode" or "2D moving image taking mode"). In a state where the reproduction mode is set by use of the mode button 22, the mode is switched by the 3D/2D switching button 24 between a "3D reproduction mode" for reproduction-displaying the multi-viewpoint image and a "2D reproduction mode" for reproduction-displaying the single-viewpoint image.

The MENU/OK button 25 is used to call a various settings screen (menu screen) for imaging and reproduction functions (MENU function) and to confirm selection content and make an instruction to perform processing (OK function). A user can set various adjustment items for the stereoscopic imaging device 1 by use of the MENU/OK button 25.

The cross button 26 is a button for performing various settings or the like and is provided to be able to perform a pressing operation in four directions, i.e., up-and-down and right-and-left directions. The DISP/BACK button 27 functions as a button for instructing to switch the display of the display unit 16.

Figure 3:
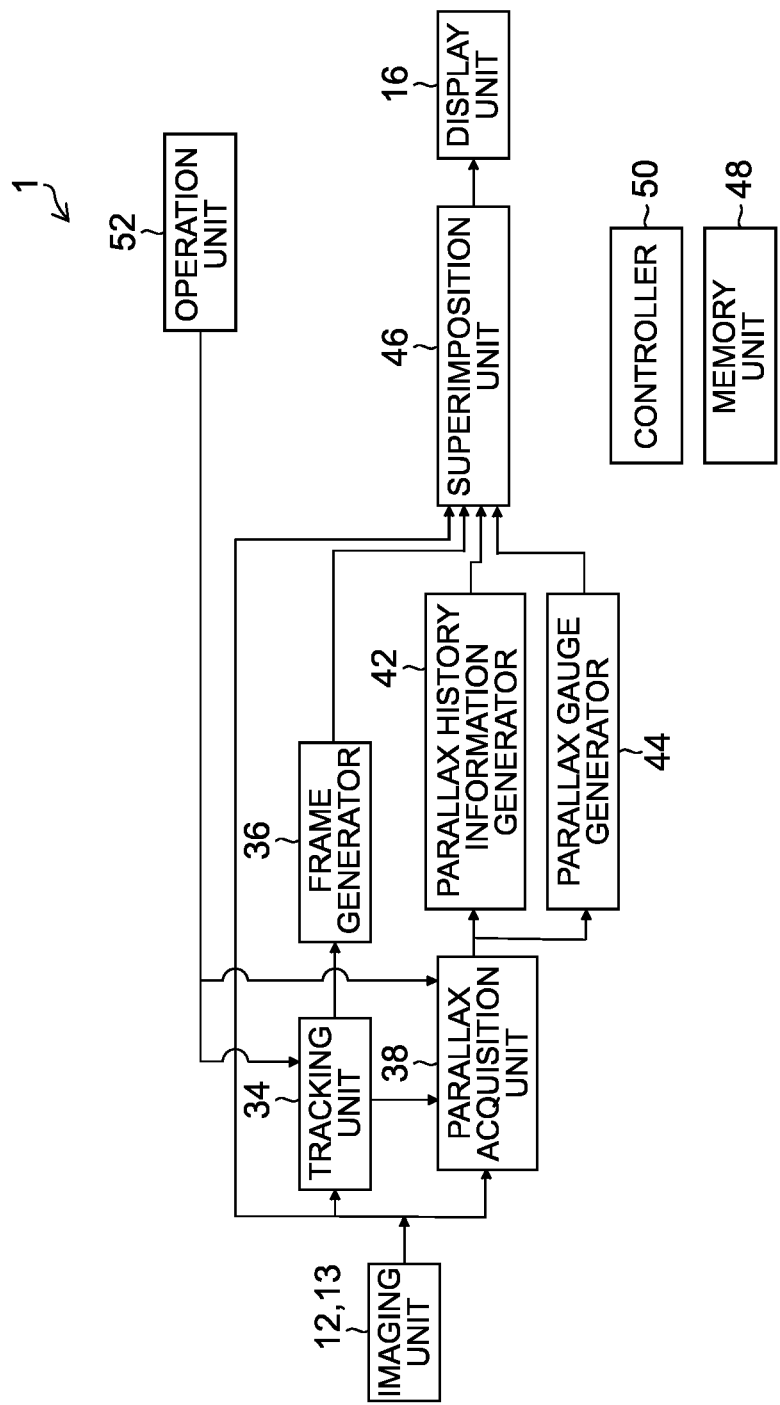
FIG. 3 is a block diagram illustrating an internal configuration example of the stereoscopic imaging device illustrated in FIG. 1 and FIG. 2.

FIG. 3 is a block diagram illustrating an internal configuration example of the stereoscopic imaging device 1 shown in FIG. 1 and FIG. 2.

Note that the following description is given in assuming that "moving image taking mode" is set by use of the mode button 22, and the 3D mode is set by use of the 3D/2D switching button 24. In other words, the "3D moving image taking mode" is set in the following description.

As shown in FIG. 3, the stereoscopic imaging device 1 in this example includes imaging units 12 and 13 (image acquisition unit), display unit 16, tracking unit 34, frame generator 36, parallax acquisition unit 38, parallax history information generator 42, parallax gauge generator 44, superimposition unit 46, controller 50 for controlling respective units in the stereoscopic imaging device 1, and operation unit 52 (instruction input unit) accepting various instruction inputs from the user.

The imaging units 12 and 13 (image acquisition unit) continuously images the subject in multi-viewpoint to acquire a moving image including continuous plural viewpoint images (left viewpoint image and right viewpoint image).

The display unit 16 performs the three-dimensional display (also referred to as "3D-display" or "stereoscopic viewing-display") or the two-dimensional display (also referred to as "2D-display" or "plane-display") of the moving image acquired by the imaging units 12 and 13.

The tracking unit 34 selects a specific subject image from the moving image acquired by the imaging units 12 and 13 and tracks the specific subject image selected from the moving image.

The frame generator 36 generates a frame image surrounding the specific subject image for each specific subject image in the moving image.

The parallax acquisition unit 38 continuously acquires parallax for the specific subject image in the moving image from the plural viewpoint images of the moving image.

The parallax history information generator 42 continuously generates parallax history information indicating variation with time of the parallax for the specific subject image in the moving image on the basis of the parallax acquired by the parallax acquisition unit 38, the parallax history information including the current parallax for the specific subject image.

The parallax gauge generator 44 generates a parallax gauge including a parallax bar which indicates the current parallax for the specific subject image included in the plural viewpoint images of the moving image.

The superimposition unit 46 superimposes on the moving image acquired by the imaging units 12 and 13 the frame image generated by the frame generator 36, the parallax history information generated by the parallax history information generator 42, and the parallax gauge generated by the parallax gauge generator 44.

The controller 50 displays on the display unit 16 in real time the plural viewpoint images of the moving image acquired by the imaging units 12 and 13 as well as the frame image generated by the frame generator 36, the parallax history information generated by the parallax history information generator 42, and the parallax gauge generated by the parallax gauge generator 44.

Note that the "specific subject" is a subject selected from the subject image in the moving image. Concrete examples of the selected "specific subject image" include a subject image of a subject on which the focus lens of each of the imaging units 12 and 13 is focused by the controller 50, a subject image (e.g., face image) detected by the tracking unit 34 by use of imaging processing, a subject image for which the user makes a selection instruction (instruction input) by the operation unit 52 and the like. Moreover, the subject image may be selected by way of other aspects than these.

The tracking unit 34, frame generator 36, parallax acquisition unit 38, parallax history information generator 42, parallax gauge generator 44, and superimposition unit 46 include a microcomputer device and electronic circuit, for example.

A description below is given of a concrete configuration of the stereoscopic imaging device 1 as an image processing device in the present invention for respective embodiments.

First Embodiment

Figure 4:
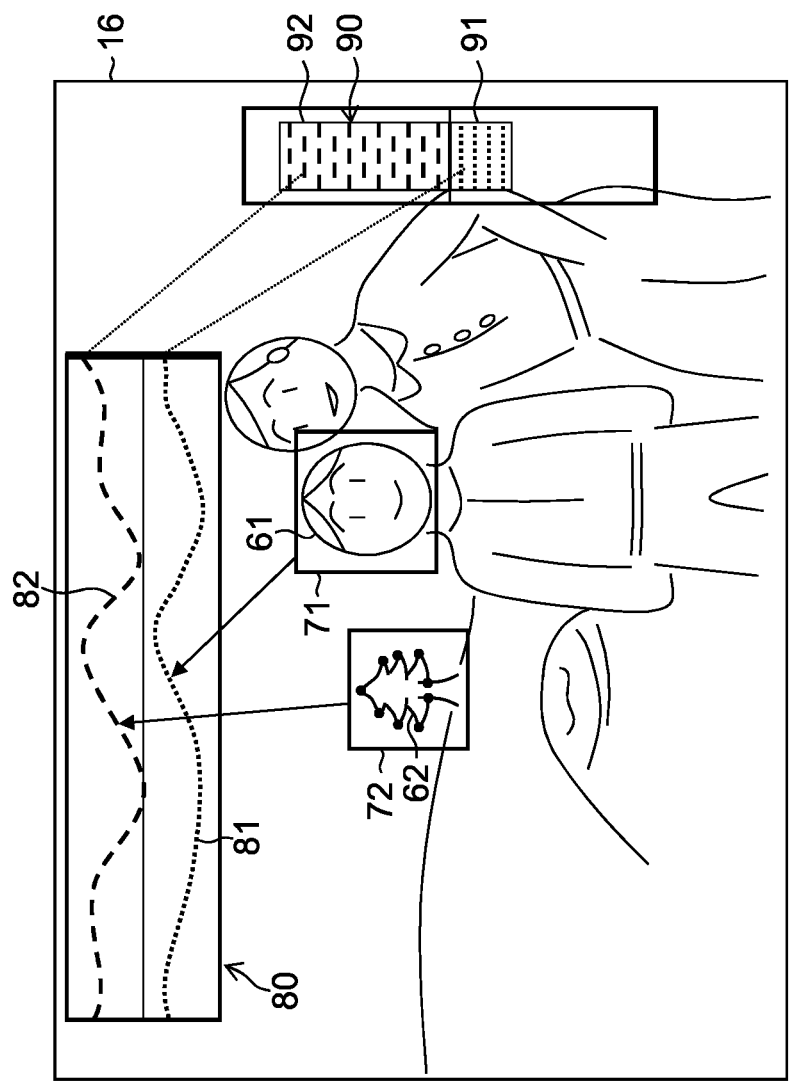
FIG. 4 is an explanatory diagram illustrating a display example of a moving image on which parallax history information and a parallax gauge are superimposed.

FIG. 4 is an explanatory diagram illustrating a display example of the moving image on which the parallax history information and the parallax gauge are superimposed.

In FIG. 4, the display unit 16 displays the current plural viewpoint images (right viewpoint image and left viewpoint image) on which the frame image 71 and frame image 72, parallax graph 80, and parallax gauge 90 are superimposed. In FIG. 4, the frame image 71 surrounds a face image 61 (convex side object) of a first person generated by the frame generator 36, and the frame image 72 surrounds a tree image 62 (concave side object). The parallax graph 80 is a display example of the parallax history information generated by the parallax history information generator 42. The parallax gauge 90 is generated by the parallax gauge generator 44. The superimposition unit 46 superimposes the frame images 71 and 72, parallax graph 80, and parallax gauge 90 on the moving image acquired by the imaging units 12 and 13 in accordance with an instruction by the controller 50.

Figure 5:
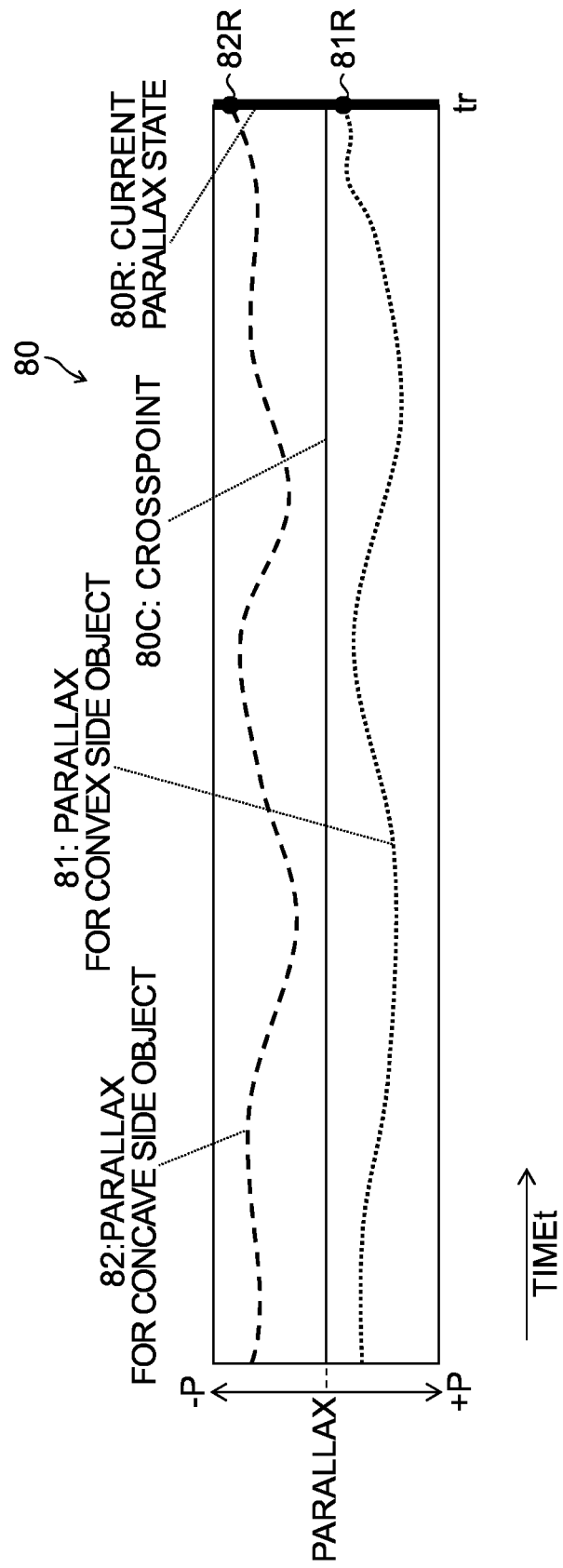
FIG. 5 is an enlarged view illustrating the parallax history information in FIG. 4 on an enlarged scale.

FIG. 5 illustrates the parallax graph 80 (parallax history information) in FIG. 4 on an enlarged scale.

In FIG. 5, a horizontal axis represents a time t, and a vertical axis represents a parallax ±P. The parallax graph 80 is a graph illustrating the variation with time of the parallax for the specific subject image (also referred to as "object"). This parallax graph 80 includes a line 80C, parallax history line 81, parallax history line 82, and parallax state 80R. The line 80C indicates a crosspoint having the parallax amount of zero. The parallax history line 81 indicates the variation with time of the parallax for the convex side object (the face image 61 of the first person in FIG. 4). The parallax history line 82 indicates the variation with time of the parallax for the concave side object (the tree image 62 in Figure). The parallax state 80R indicates the parallax state at a current time point tr. In this parallax graph 80, the larger a parallax magnitude (projection amount) of the face image 61 (convex side object), the further a point on the parallax history line 81 indicating the variation with time of that parallax departs from the line 80C indicating the crosspoint. In addition, the larger a parallax magnitude (retraction amount) of the tree image 62 (concave side object), the further a point on the parallax history line 82 indicating the variation with time of that parallax departs from the line 80C indicating the crosspoint.

In other words, the parallax graph 80 is the parallax history information visually indicating the variation with time of the parallax for the specific objects 61 and 62, the parallax history information including the current parallax for the specific objects 61 and 62. Here, the "parallax" includes a positive or negative sign indicating whether the subject image (stereoscopic image) is on the convex side (looks projecting) or the concave side (looks retracting) and information indicating a parallax magnitude (parallax amount).

The parallax graph 80 (parallax history information) is displayed on the display unit 16 in real time at the same time with the moving image. That is, the parallax history lines 81 and 82 in the parallax graph 80 vary with time depending on the variation with time of the parallax for the subject image in the moving image.

Note that the parallax graph 80 may not necessarily update the parallax graph 80 of the moving image for each frame. The parallax graph 80 may also update and display at every adequate number of frames, for example. Moreover, a parallax acquisition cycle in the parallax acquisition unit 38 and a generation cycle (frame interval) for the parallax graph 80 in the parallax history information generator 42 may be different from a display cycle (frame interval) for the parallax graph 80 in the display unit 16. For example, the parallax graph 80 may be displayed at an integral multiple cycle of the generation cycle (and parallax acquisition cycle) for the parallax graph 80 (i.e. at a cycle longer than the generation cycle (and parallax acquisition cycle) of the parallax graph 80). In other words, the parallax history information may be thinned in time series and displayed.

FIG. 6A to FIG. 6C illustrate the parallax gauge 90 in FIG. 4 on an enlarged scale. Note that FIG. 6B illustrates an example in which the parallax amounts (retraction amount, projection amount) are larger on both the concave side and the convex side in comparison with a state of FIG. 6A. FIG. 6C illustrates an example in which the parallax amounts (retraction amount, projection amount) are smaller on both the concave side and the convex side in comparison with a state of FIG. 6A.

In FIG. 6A to FIG. 6C, the parallax gauge 90 indicates, with respect to a line 90C indicating the crosspoint as a center, the current parallax magnitude (projection amount) of the convex side object (the face image 61 of the first person in FIG. 4) by a parallax bar 91 on the convex side with a downward direction in the figure being taken as a displacement direction, and the current parallax magnitude (retraction amount) of the concave side object (the tree image 62 in FIG. 4) by a parallax bar 92 on the concave side with a upward direction in the figure being taken as a displacement direction.

In other words, the parallax gauge 90 represents the positive or negative sign of the parallax for the specific objects 61 and 62 (representing whether on the convex side or on the concave side) in terms of the displacement direction of the parallax bars 91 and 92, and represents the parallax magnitude in terms of lengths of the parallax bars 91 and 92. In this example, the parallax magnitude (projection amount) on the convex side is indicated by the parallax bar 91 in the downward direction and the parallax magnitude (retraction amount) on the concave side is indicated by the parallax bar 92 in the upward direction.

In FIG. 4, the frame image 71 marked on the face image (a first subject image) 61 of the first person, the parallax history line 81 indicating the parallax variation of the first subject image 61 in the parallax graph 80, and the parallax bar 91 indicating the parallax for the first subject image 61 in the parallax gauge 90 are drawn with the same color and the same pattern. Similarly, the frame image 72 marked on the tree image (a second subject image) 62, the parallax history line 82 indicating the parallax variation of the second subject image 62 in the parallax graph 80, and the parallax bar 92 indicating the parallax for the second subject image 62 in the parallax gauge 90 are drawn with the same color and the same pattern. In this way, the frame generator 36, parallax history information generator 42, and parallax gauge generator 44 generate marks (frame images 71 and 72 in this example) corresponding to the same subject image, parallax history lines 81 and 82, and parallax bars 91 and 92 with the same color and the same pattern (only one of the color and the pattern may be the same) such that an observer may easily recognize a correspondence relationship. As shown in FIG. 4, the frame image 71 or 72, parallax history line 81 or 82, and parallax bar 91 or 92 which respectively correspond to the same subject image may be coupled by a line (e.g., arrowed line or dotted line) and drawn.

Figure 7:
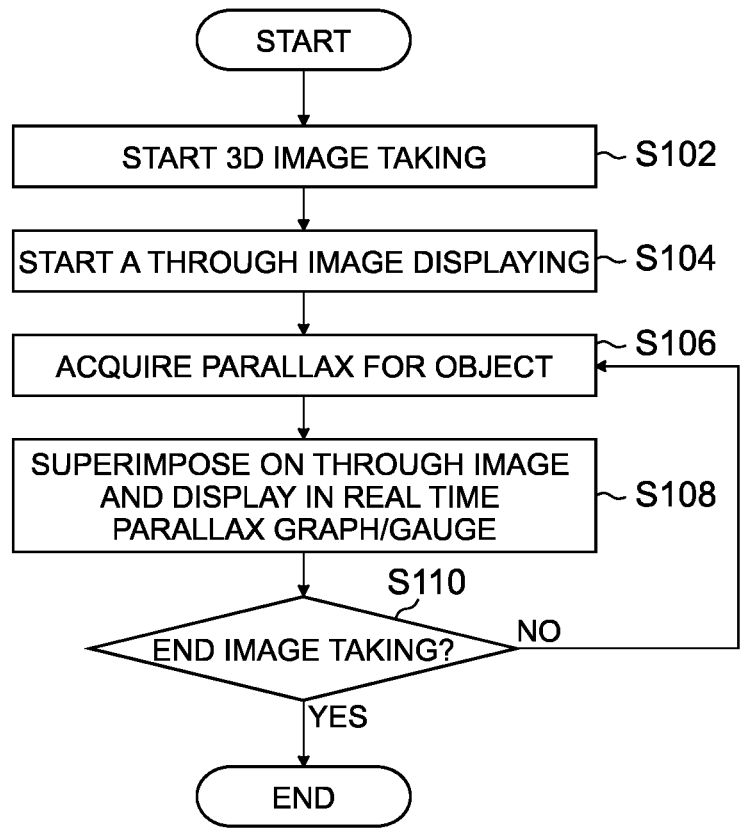
FIG. 7 is a flowchart illustrating an image processing example in a first embodiment.

FIG. 7 is a flowchart illustrating an example of image-taking processing (image processing) performed by the controller 50 in the first embodiment.

At step S102, 3D (stereoscopic) image taking starts.

At step S104, displaying a through image (live view image) starts.

At step S106, the parallax acquisition unit 38 acquires the parallax for a specific object (subject image) from the left viewpoint image and right viewpoint image. In this example, the tracking unit 34 selects the specific subject image from the through image which is the moving image acquired by the imaging units 12 and 13 and tracks the selected specific subject image in the through image. The parallax acquisition unit 38 calculates continuously in terms of time the parallax for at least the subject image which is selected and being tracked by tracking unit 34. The tracked subject image may be the subject image for which the user makes the selection instruction by use of the operation unit 52, the face image detected by way of face recognition using the image processing, a feature point image (e.g., tree image) obtained by detecting a feature point by way of feature point detection, and the subject image of a subject on which the focus lens of the imaging units 12 and 13 is focused.

At step S108, as shown in FIG. 4 to FIG. 6C, the frame generator 36 generates the frame images 71 and 72, the parallax history information generator 42 generates the parallax graph 80 as the parallax history information, and the parallax gauge generator 44 generates the parallax gauge 90. Then, the frame images 71 and 72, parallax graph 80 and parallax gauge 90 are superimposed on the through image (moving image) by the superimposition unit 46 and displayed on the display unit 16 in real time.

At step S110, whether or not the image taking ends is determined. If the image taking does not end, the process returns to step S106. At step S106, the parallax for the specific object is continuously acquired. At step S108, the parallax graph 80 indicating parallax history including the current parallax is continuously generated, and the parallax gauge 90 indicating the current parallax is generated. Then, these parallax graph 80 and parallax gauge 90 are superimposed on the through image. These steps S106 and S108 are repeated until the image taking is determined to end at step S110.

The frame image is described as an example of a mark given to each specific subject image in the moving image, but the mark in the present invention is not specifically limited to the frame image. For example, signs of star, arrow and the like may be used. The parallax history information generator 42 visually associates the mark with each specific subject image to generate the parallax history information indicating the parallax variation. For example, the parallax history information generator 42 generates a graph (parallax graph) including the parallax history line having at least one of a color and pattern which is the same as the mark for each specific subject as the parallax history information.

Second Embodiment

A second embodiment uses the operation unit 52 as a marking target number instruction input unit which accepts the instruction input for the number of the subject images of marking target (hereinafter, referred to as "marking target number"). Note that a description is omitted below of the content already described in the first embodiment.

The frame generator 36 (image processor) generates the frame image to be given to each of the subject images of marking target, the number of the frame images being the same as the number of the marking targets instructed by the operation unit 52. The parallax history information generator 42 generates the parallax graph 80 (parallax history information) indicating the variation with time of the parallax for each of the subject images of marking target, the number of the parallax graphs being the same as the number of the marking targets instructed by the operation unit 52. The parallax gauge generator 44 generates the parallax gauge 90 indicating the current parallax for each of the subject images of marking target, the number of the parallax gauges being the same as the number of the marking targets instructed by the operation unit 52. The superimposition unit 46 superimposes the frame images generated by the frame generator 36 on the moving image, the number of the frame images being the same as the number of the marking targets instructed, as well as superimposes the parallax graphs 80 generated by the parallax history information generator 42 and the parallax gauges generated by the parallax gauge generator 44 on the moving image.

FIG. 8A to FIG. 8C are an explanatory diagram illustrating an example of the moving image which is subjected to stereoscopic viewing-display on the display unit 16 in the second embodiment. Note that in FIG. 8A the number of the marking targets is two, in FIG. 8B the number of the marking targets is four, and in FIG. 8C the number of the marking targets is one.

In FIG. 8A to FIG. 8C, reference numerals 61 to 64 designate the subject images of marking target, and reference numerals 71 to 74 designate the frame images as marks given to the subject images of marking target. Reference numeral 80 designates the parallax graph, and reference numerals 81 to 84 designate the parallax history lines each indicating the variation with time of the parallax for the subject image of marking target. Reference numeral 90 designates the parallax gauge, and reference numerals 91 to 94 designate the parallax bars each indicating the current parallax for the subject image of marking target. When the operation unit 52 switches the number of the marking targets, the frame generator 36 switches the number of the frame images in response to the number of the marking targets being switched. The parallax history information generator 42 switches the number of the parallax history lines in response to the number of the marking targets being switched. The parallax gauge generator 44 switches the number of the parallax bars in response to the number of the marking targets being switched.

In a case where the tracking unit 34 selects plural specific subject images, the parallax history information generator 42 in this example generates the parallax history information for the nearest subject image and the farthest subject image of these plural specific subject images by default. In other words, the parallax history information generator 42 in this example generates the parallax history information with the marking number being two by default as shown in FIG. 8A.

Further, in a case where the tracking unit 34 selects plural specific subject images, the parallax gauge generator 44 in this example generates the parallax bars for the nearest subject image and the farthest subject image of these plural specific subject images by default. In other words, the parallax gauge generator 44 in this example generates the parallax gauge with the marking number being two by default as shown in FIG. 8A.

In addition, in a case where the tracking unit 34 selects plural specific subject images, the frame generator 36 in this example generates the frame images for the nearest subject image and the farthest subject image of these plural specific subject images by default. In other words, the frame generator 36 in this example generates the frame image with the marking number being two as shown in FIG. 8A by default.

Figure 9:
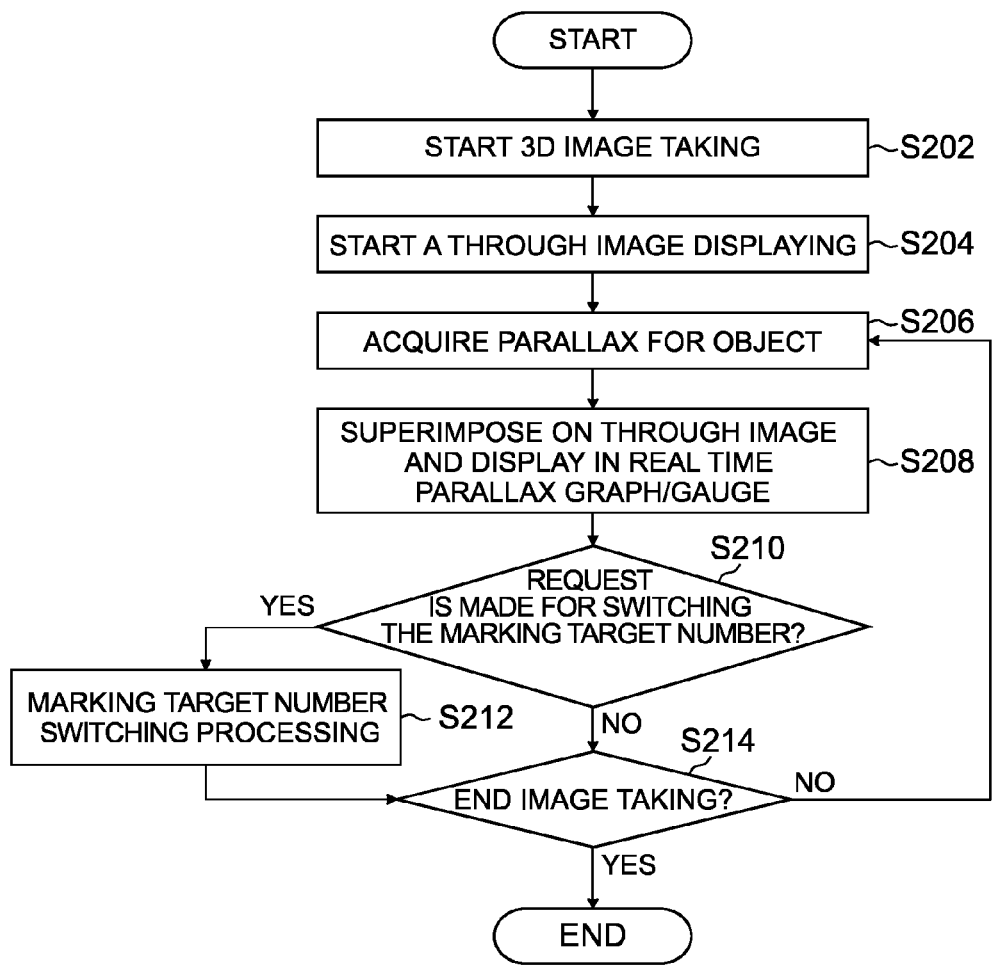
FIG. 9 is a flowchart illustrating an image processing example in the second embodiment.

FIG. 9 is a flowchart illustrating an example of the image-taking processing (image processing) performed by the controller 50 in the second embodiment.

In FIG. 9, steps S202 to S208 are similar to steps S102 to S108 in the image processing shown in FIG. 7 in the first embodiment, and a description thereof is omitted.

At step S210, whether or not a request is made for switching the marking target number by the operation unit 52 is determined. If the request for switching the marking target number is made, at step S212 marking target number switching processing is performed.

At step S214, whether or not the image taking ends is determined, and if the image taking does not end, the process returns to step S206.

Note that at step S206 the parallax is acquired for each of the marking target number of objects (subject images) instructed by way the operation unit 52. At step S208 the frame image, parallax graph, and parallax gauge are generated for each of the marking target number of objects instructed by way the operation unit 52 and are superimposed on the moving image to be displayed on the display unit 16.

First, a detailed description is given of the case shown in FIG. 8A of the marking target number being two. In this example, one representative object for each of the concave side and the convex side (two in total) is selected as the marking target. In other words, the instruction input is made for the face image 61 of the first person and the tree image 62 as the marking targets to make the instruction input of the marking target number being two. For example, a touch operation is performed on portions on the screen of the display unit 16 where the face image 61 of the first person and the tree image 62 are displayed by use of the touch sensor provided on the screen of the display unit 16 such that the instruction input is made for the marking target. In a case of no instruction input for the marking target like this, the nearest subject image and the farthest subject image are selected as the marking targets by default. First, superimposed on the moving image are the frame image 71 surrounding the face image 61 of the first person and the frame image 72 surrounding the tree image 62. Second, superimposed on the moving image is the parallax graph 80 including the parallax history line 81 (line indicating the parallax history including the current parallax) for the face image 61 of the first person and the parallax history line 82 of the tree image 62. Third, superimposed on the moving image is the parallax gauge 90 including the parallax bar 91 (bar indicating the current parallax) for the face image 61 of the first person and the parallax bar 92 for the tree image 62.

Next, a description is given of the case shown in FIG. 8B of the marking target number being four. In this example, two representative objects for each of the concave side and the convex side (four in total) are selected as the marking targets. In other words, the instruction input is additionally made for a face image 63 of a second person and a rock portion image 64 as the marking targets, in addition to the face image 61 of the first person and the tree image 62, to make the instruction input of the marking target number being four. For example, a touch operation is performed on portions on the screen of the display unit 16 where the face image 63 of the second person and the rock portion image 64 are displayed by use of the touch sensor provided on the screen of the display unit 16 such that the instruction input is made to add the marking target. First, superimposed on the moving image are the frame image 73 surrounding the face image 63 of the second person and the frame image 74 surrounding the rock portion image 64, in addition to the frame images designated by the reference numerals 71 and 72. Second, superimposed on the moving image are the parallax history line 83 for the face image 63 of the second person and the parallax history line 84 for the rock portion image 64, in addition to the parallax history lines designated by the reference numerals 81 and 82. Third, superimposed on the moving image are the parallax bar 93 for the face image 63 of the second person and the parallax bar 94 for the rock portion image 64 in addition to the parallax bars designated by the reference numerals 81 and 82.

Next, a description is given of the case shown in FIG. 8C of the marking target number being one. In this example, only the face image 61 of the first person is the marking target. For example, a double-touch operation is performed on the screen of the display unit 16 where the face image 61 of the first person is displayed by use of the touch sensor provided on the screen of the display unit 16 such that the instruction input is made to display the detail information on the face image 61 of the first person. In other words, the instruction input made to display the detail information makes the instruction input of the marking target number being one. First, superimposed on the moving image is the frame image 71 surrounding the face image 61 of the first person. Second, superimposed on the moving image is the parallax history line 81 for the face image 61 of the first person. Third, superimposed on the moving image is the parallax bar 91 for the face image 61 of the first person. Further, superimposed on the moving image is the detail information on the face image 61 of the first person. In FIG. 8C, as the detail information, an object kind (face), coordinates on the moving image, and parallax are additionally superimposed on the moving image.

Note that the description above is given as the example of the case where the instruction input for the marking target is accepted to count the marking target number, but the instruction input for the marking target number (e.g., an input of the marking target number being "four" in the case of FIG. 8B) may be directly accepted.

According to the embodiment, during displaying the moving image (e.g., through image), the parallax history including the current parallaxes for the plural marking targets can be confirmed in a form of list. Moreover, during displaying the moving image (e.g., through image) (e.g., during pause displaying), the detail information on the parallax can be confirmed about one marking target for which the selection instruction input is made by the operation unit 52.

In this example, carrying out the present invention in taking a 3D image allows a desired 3D image to be easily acquired. For example, in the display example (plural objects display) shown in FIG. 8B, the parallax adjustment is facilitated which is for making the parallax amount (parallax magnitude) of the plural objects (subject images) in the entire moving image fall within a certain range. Moreover, the parallax adjustment is facilitated which is for setting the crosspoint among the intended plural objects.

Third Embodiment

A third embodiment uses the operation unit 52 as marking target instruction input unit which accepts the instruction input indicating the subject image of marking target in the moving image. Note that a description is omitted below of the content already described in the first embodiment and the second embodiment.

The frame generator 36 generates the frame image to be given to the subject image of marking target instructed by the operation unit 52. The parallax history information generator 42 generates the parallax graph 80 (parallax history information) indicating the variation with time of the parallax for the subject image of marking target instructed by the operation unit 52. The parallax gauge generator 44 generates the parallax gauge 90 indicating the current parallax for the subject image of marking target instructed by the operation unit 52. The superimposition unit 46 superimposes the frame image generated by the frame generator 36 on the moving image as well as superimposes the parallax graph 80 generated by the parallax history information generator 42 and the parallax gauge generated by the parallax gauge generator 44 on the moving image.

Figure 10A:
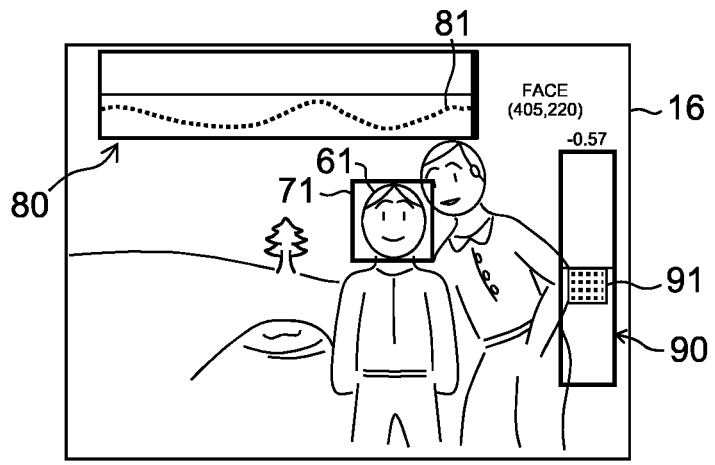
FIG. 10A is an explanatory diagram illustrating a display example of a moving image in a third embodiment (example 1)
Figure 10B:
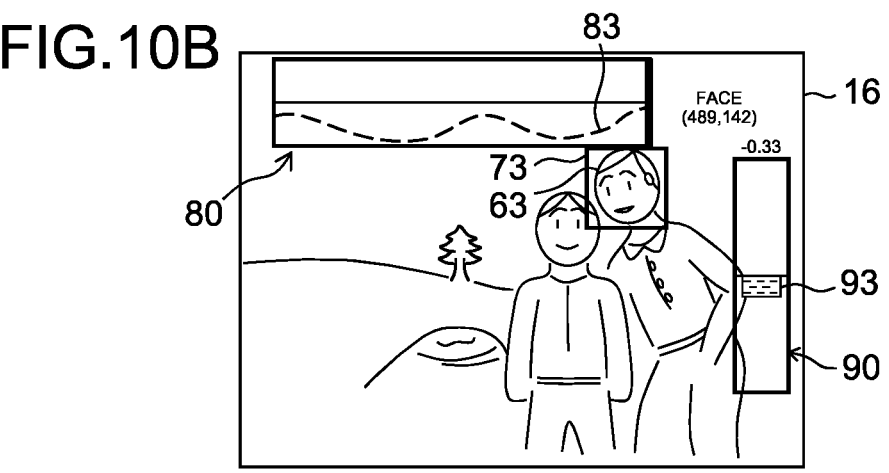
FIG. 10B is an explanatory diagram illustrating a display example of the moving image in the third embodiment (example 2).
Figure 10C:
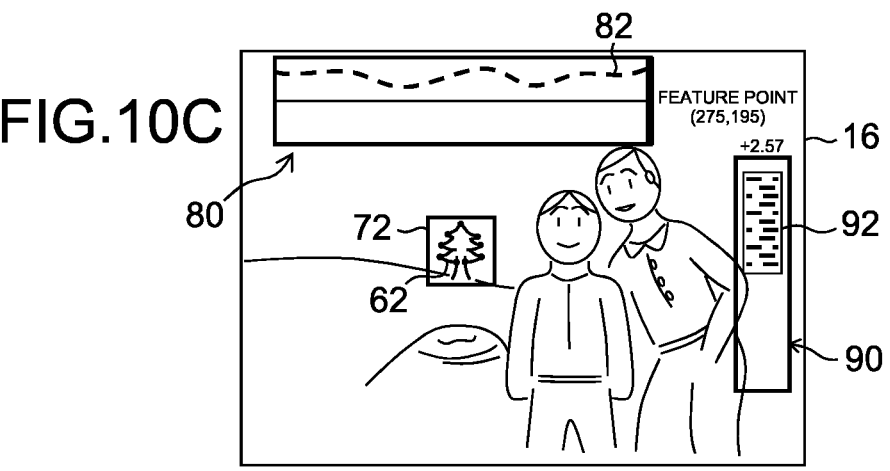
FIG. 10C is an explanatory diagram illustrating a display example of the moving image in the third embodiment (example 3).

FIG. 10A to FIG. 10C are each an explanatory diagram illustrating an example of the moving image which is subjected to stereoscopic viewing-display on the display unit 16 in the third embodiment. Note that FIG. 10A illustrates a state where the instruction input is made for the face image 61 of the first person on the convex side as the subject image of marking target. FIG. 10B illustrates a state where the instruction input is made for the face image 63 of the second person on the convex side as the subject image of marking target. FIG. 10C illustrates a state where the instruction input is made for the tree image 62 on the concave side as the subject image of marking target.

In this example, the touch sensor constituting the operation unit 52 accepts the instruction input for the subject image of marking target. In this example, when the subject image of marking target is selected according to the instruction input from the touch sensor in the operation unit 52, the frame generator 36 gives the frame image to the selected subject image. Then, the parallax history information generator 42 generates the parallax history information for the selected subject image. In this way, the parallax history information and parallax gauge are switched and displayed depending on the selection of the subject image by way of the operation unit 52.

Note that in this example the frame image may be given respectively to the nearest subject image and the farthest subject image to generate the parallax history information and the parallax bar by default (in a stage before the above instruction input is made) similarly to the above embodiments. In other words, in a case where the tracking unit 34 selects the plural specific subject images, the parallax history information generator 42 in this example generates the parallax history information for the nearest subject image and the farthest subject image of these plural specific subject images by default. In other words, the parallax history information generator 42 in this example selects one subject image for each of the concave side and the convex side to generate the parallax history information by default as shown in FIG. 8A.

Additionally, in a case where the tracking unit 34 selects the plural specific subject images, the parallax gauge generator 44 in this example generates the parallax bars for the nearest subject image and the farthest subject image of these plural specific subject images by default. In other words, the parallax gauge generator 44 in this example selects one subject image for each of the concave side and the convex side to generate the parallax gauge by default as shown in FIG. 8A.

Moreover, in a case where the tracking unit 34 selects the plural specific subject images, the frame generator 36 in this example generates the frame images for the nearest subject image and the farthest subject image of these plural specific subject images by default. In other words, the frame generator 36 in this example selects one subject image for each of the concave side and the convex side to generate the frame image by default as shown in FIG. 8A.

Figure 11:
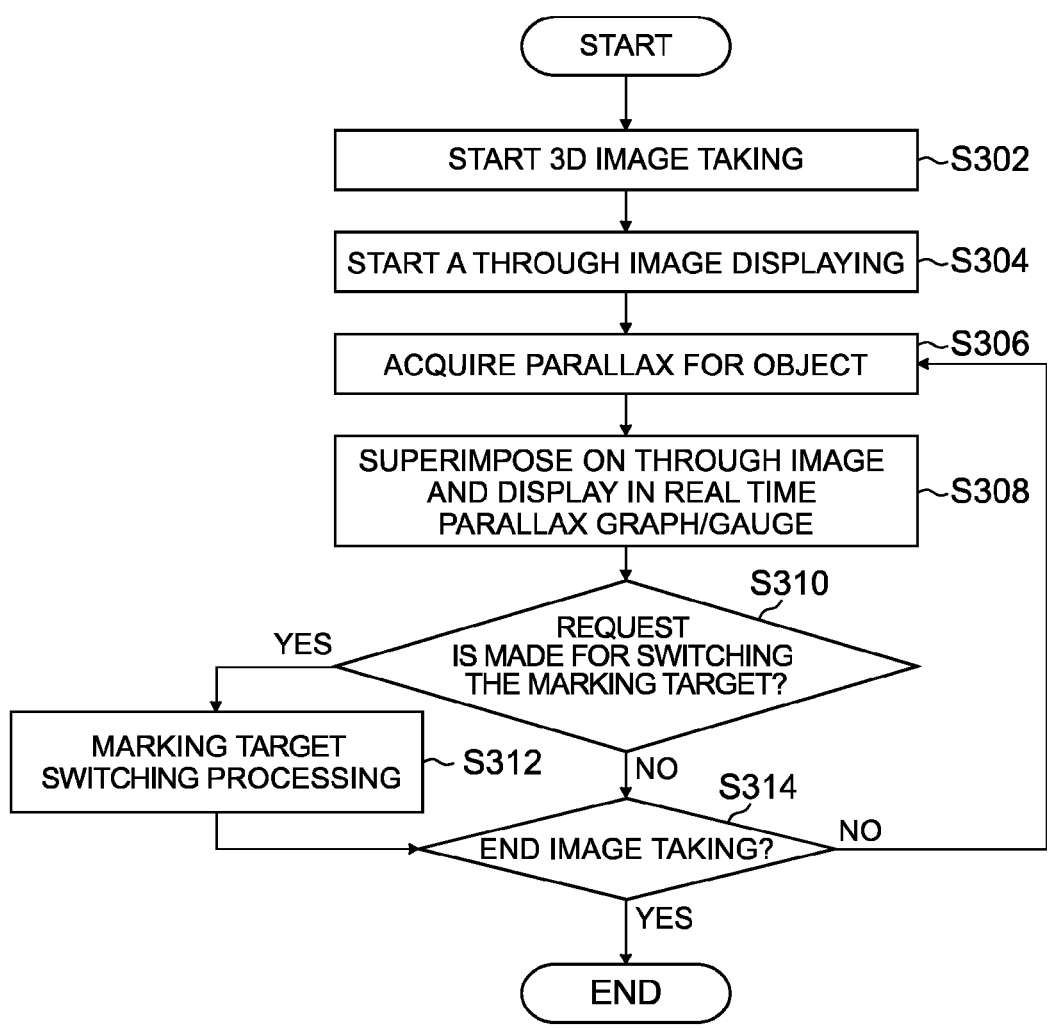
FIG. 11 is a flowchart illustrating an image processing example in the third embodiment.

FIG. 11 is a flowchart illustrating an example of the image-taking processing (image processing) performed by the controller 50 in the third embodiment.

In FIG. 11, steps S302 to S308 are similar to steps S102 to S108 in the image processing shown in FIG. 7 in the first embodiment, and a description thereof is omitted.

At step S310, whether or not a request is made for switching the marking target is determined. If the request for switching the marking target is made, at step S312 marking target switching processing is performed.

At step S314, whether or not the image taking ends is determined, and if the image taking does not end, the process returns to step S306.

For example, as shown in FIG. 10A when the instruction input is made for the face image 63 of the second person as a new marking target by use of the touch sensor in a state where the face image 61 of the first person is the marking target, the frame generator 36 generates the frame image 73 for the face image 63 of the second person as shown in FIG. 10B, the superimposition unit 46 superimposes the frame image 73 on the through image (moving image), and the display unit 16 displays the through image.

According to the embodiment, since the marking target can be arbitrarily changed, the parallax amount of any object (subject image) can be grasped easily and reliably to perform 3D imaging and 3D reproduction-displaying.

Fourth Embodiment

In a fourth embodiment, when the subject image of marking target is changed according to the instruction input from the operation unit 52 (marking target instruction input unit), the parallax history information generator 42 generates the parallax graph (parallax history information) indicating the variation with time of the parallax for the subject image of marking target before change until the time of the change as well as indicating the variation with time of the parallax for the subject image of marking target after the change from the time of the change. Note that a description is omitted below of the content already described in the first embodiment to the third embodiment.

Figure 12A:
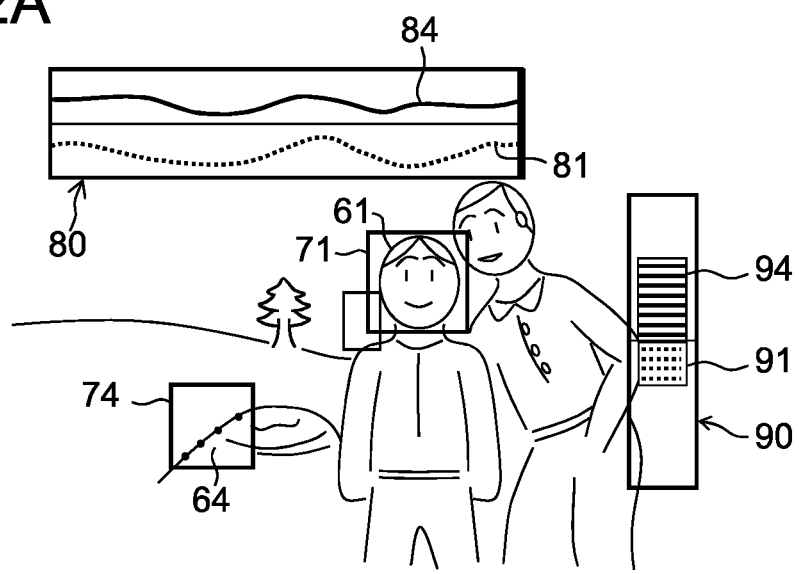
FIG. 12A is an explanatory diagram illustrating a display example of a moving image in a fourth embodiment (before changing a marking target)
Figure 12B:
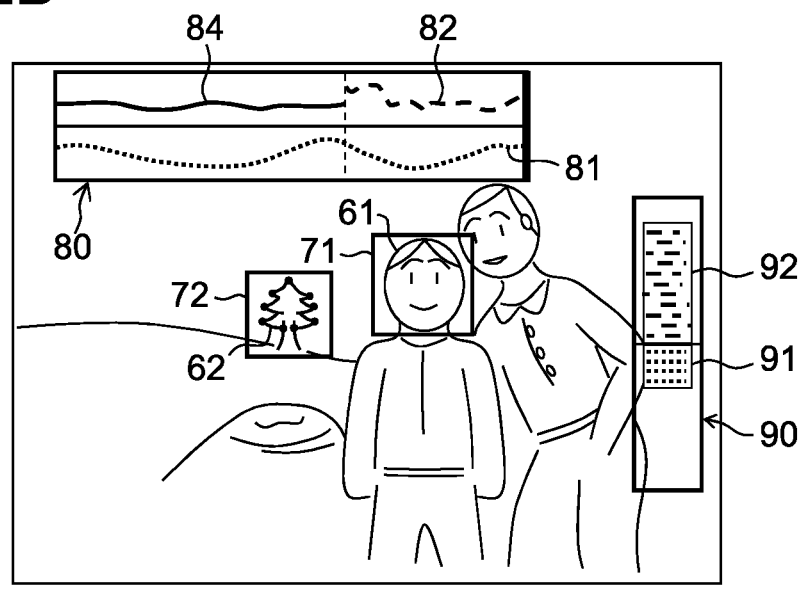
FIG. 12B is an explanatory diagram illustrating a display example of the moving image in the fourth embodiment (after changing the marking target).

FIG. 12A and FIG. 12B are each an explanatory diagram illustrating an example of the moving image which is subjected to stereoscopic viewing-display on the display unit 16 in the fourth embodiment. Note that in FIG. 12A the marking targets are the face image 61 of the first person and the rock portion image 64. In FIG. 12B the marking targets are the face image 61 of the first person and the tree image 62. Moreover, in this example, the touch sensor constituting the operation unit 52 accepts the instruction input for the subject image of marking target.

Figure 13:
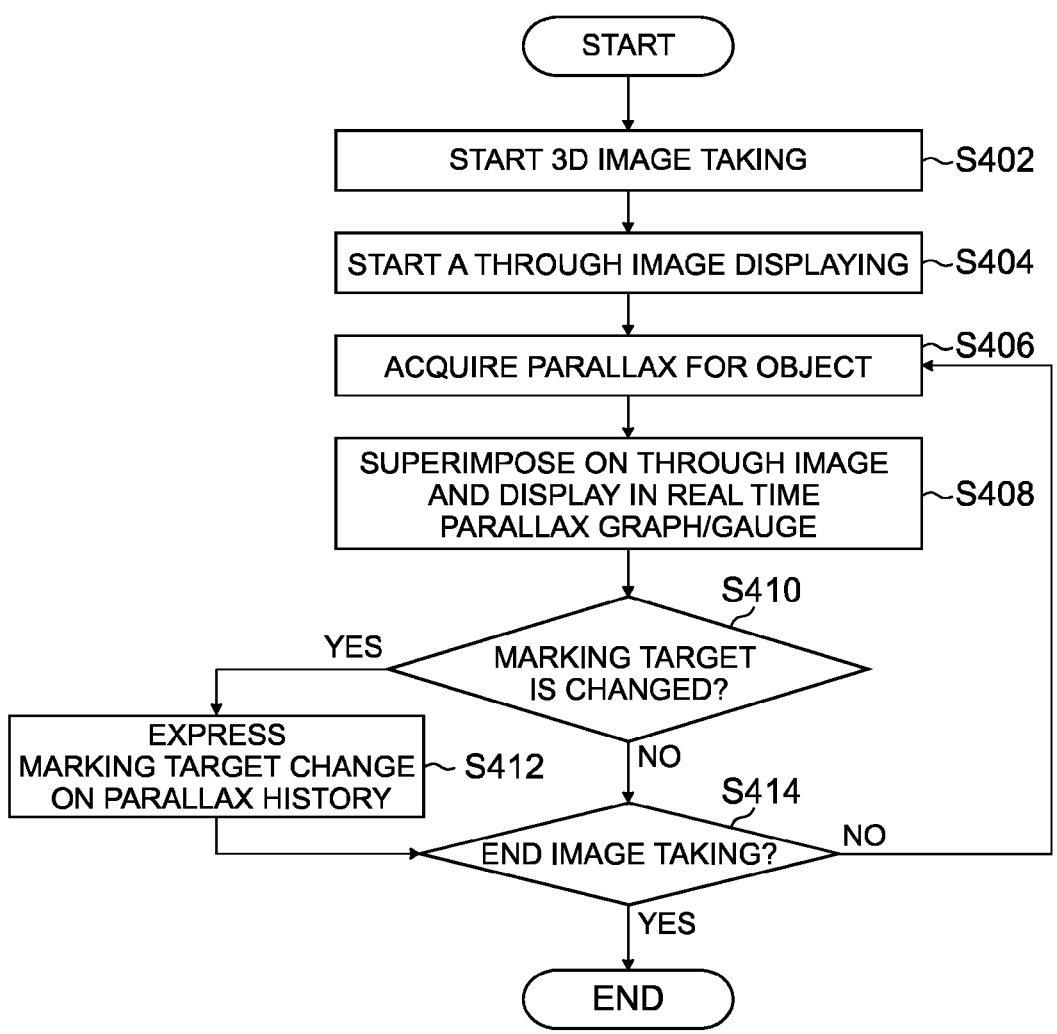
FIG. 13 is a flowchart illustrating an image processing example in the fourth embodiment.

FIG. 13 is a flowchart illustrating an example of the image-taking processing (image processing) performed by the controller 50 in the fourth embodiment.

In FIG. 13, steps S402 to S408 are similar to steps S102 S108 in the image processing shown in FIG. 7 in the first embodiment, and a description thereof is omitted.

At step S410, whether or not the marking target is changed is determined. If the marking target is changed, at step S412 the marking target change is expressed on the parallax history information (parallax graph 80) and the parallax gauge 90.

At step S414, whether or not the image taking ends is determined. If the image taking does not end, the process returns to step S406.

For example, it is assumed that in a state where the face image 61 of the first person and the rock portion image 64 are the marking targets as shown in FIG. 12A, the instruction input is made by use of the touch sensor such that, of the face image 61 of the first person and the rock portion image 64, the marking target is changed from the rock portion image 64 to the tree image 62. Then, the parallax history information generator 42 generates the parallax graph 80 which includes the parallax history line 81 indicating the variation with time of the parallax for the face image 61 of the first person, the parallax history line 84 indicating the variation with time of the parallax for the rock portion image 64 before the marking target is changed, and the parallax history line 82 indicating the variation with time of the parallax for the tree image 62 after the marking target is changed, as shown in FIG. 12B. The parallax gauge generator 44 generates the parallax gauge 90 which includes the parallax bar 91 indicating the current parallax for the face image 61 of the first person and the parallax bar 92 indicating the current parallax for the tree image 62. The superimposition unit 46 superimposes the frame images 71 and 72 generated by the frame generator 36, the parallax graph 80 generated by the parallax history information generator 42, and the parallax gauge 90 generated by the parallax gauge generator 44 on the through image (moving image), and the display unit 16 displays the through image.

In other words, when the operation unit 52 (marking target number instruction input unit) switches the marking target from the rock portion image 64 to the tree image 62, the controller 50 in this example, depending on the switching, switches a destination to which the frame image as a mark is given from the rock portion image 64 to the tree image 62, and changes the parallax history line presented in the parallax graph 80 from the parallax history line 84 indicating the variation with time of the parallax for the rock portion image 64 to the parallax history line 82 indicating the variation with time of the parallax for the tree image 62. Further, the parallax bar presented in the parallax gauge 90 is changed from the parallax bar 94 indicating the current parallax for the rock portion image 64 to the parallax bar 92 indicating the current parallax for the tree image 62. In this case, the parallax graph 80 indicates the variation with time until the time of the change of the parallax for the rock portion image 64 which is the marking target before the change as well as indicates the variation with time from the time of the change of the parallax for the tree image 62 which becomes the marking target after the change.

According to the embodiment, the user can be clearly notified of that the marking target is changed in the middle of the processing.

Fifth Embodiment

In a fifth embodiment, in a case where an operation is performed concerning the parallax in the moving image, the parallax history information generator 42 adds operation history information indicating a timing of the operation concerning the parallax in the moving image to the parallax history information. Note that a description will be omitted of the content already described in the first embodiment to the fourth embodiment.

Figure 14:
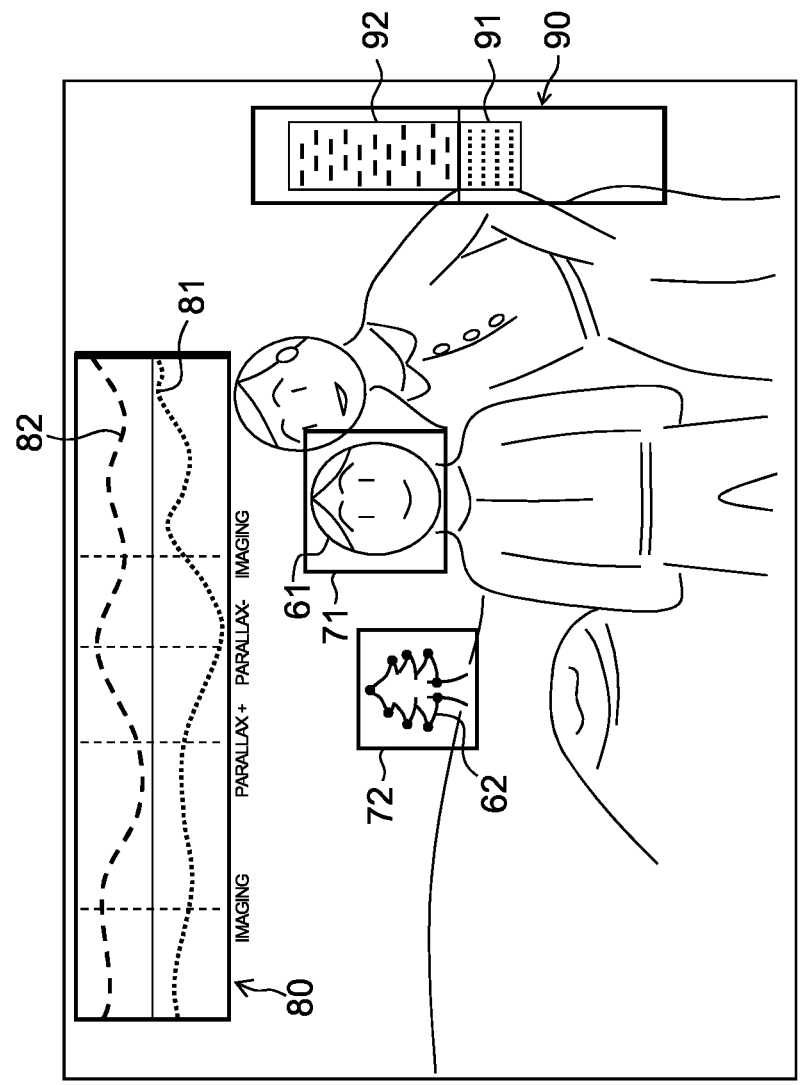
FIG. 14 is an explanatory diagram illustrating a display example of a moving image in a fifth embodiment.

FIG. 14 is an explanatory diagram illustrating an example of the moving image which is subjected to stereoscopic viewing-display on the display unit 16 in the fifth embodiment. In FIG. 14, the parallax graph 80 is added with "imaging" in imaging and "parallax+" or "parallax−" in parallax adjustment as the operation history information.

Figure 15:
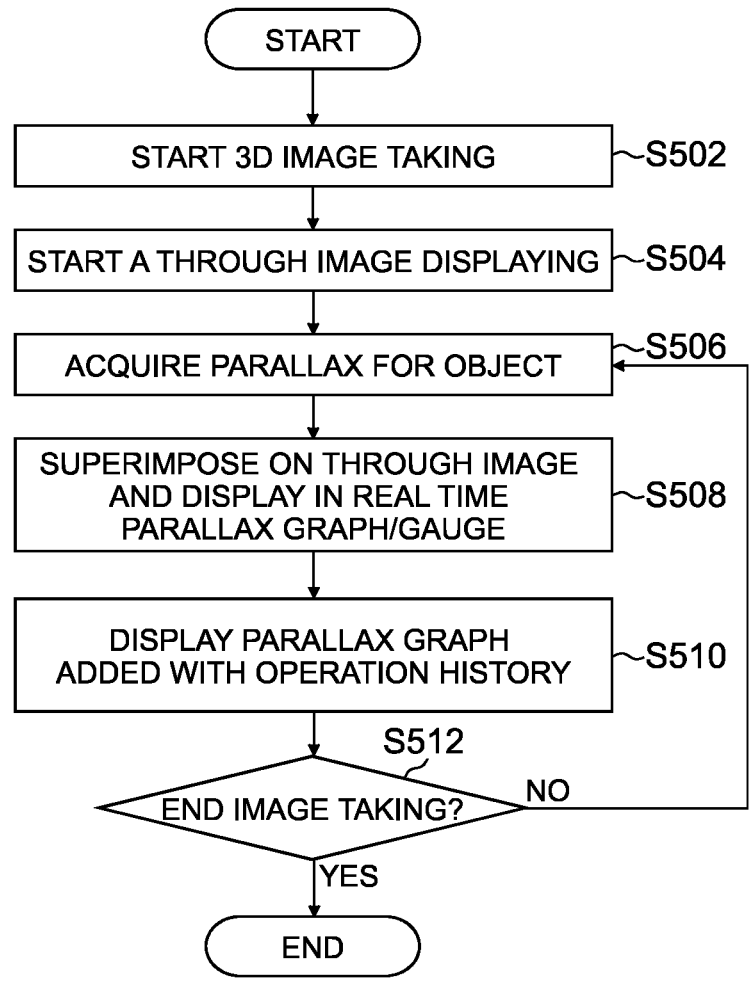
FIG. 15 is a flowchart illustrating an image processing example in the fifth embodiment.

FIG. 15 is a flowchart illustrating an example of the image-taking processing (image processing) performed by the controller 50 in the fifth embodiment.

In FIG. 15, steps S502 to S508 are similar to steps S102 to S108 in the image processing shown in FIG. 7 in the first embodiment, and a description thereof is omitted.

At step S510, the parallax history information generator 42 generates the parallax graph 80 added with the operation history information indicating a timing of the operation concerning the parallax amount in the moving image as well as the parallax gauge generator 44 generates the parallax gauge 90. Then the superimposition unit 46 superimposes the generated parallax graph 80 and parallax gauge 90 on the through image to display the through image on the display unit 16.

According to the embodiment, the operation concerning the parallax amount and the parallax amount variation are associated with each other and displayed, which allows to visually and intuitively grasp the relationship between the operation and the parallax amount otherwise difficult to comprehend. Therefore, according to the embodiment, parallax amount adequacy determination or parallax adjustment operation can be assisted in the 3D imaging and 3D reproduction-displaying by the user.

Sixth Embodiment

In a sixth embodiment, the parallax history information generator 42 and the parallax gauge generator 44 respectively generate the parallax graph (parallax history information) and parallax gauge which present a parallax range suitable to stereoscopic viewing (recommended parallax area). Note that a description is omitted below of the content already described in the first embodiment to the fifth embodiment.

Figure 16:
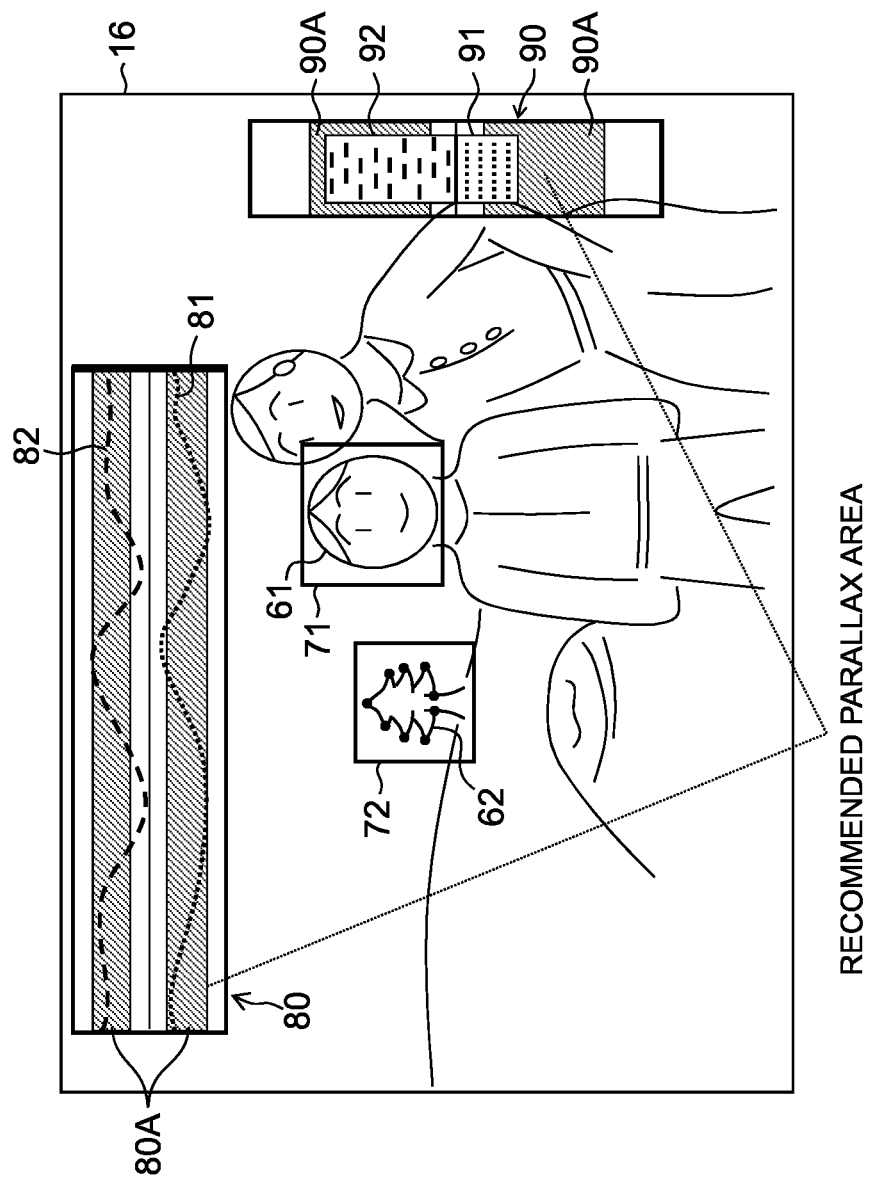
FIG. 16 is an explanatory diagram illustrating a display example of a moving image in a sixth embodiment.

FIG. 16 is an explanatory diagram illustrating an example of the moving image which is subjected to stereoscopic viewing-display on the display unit 16 in the sixth embodiment. In FIG. 16, the parallax graph 80 and the parallax gauge 90 respectively have the recommended parallax areas 80A and 90A displayed thereon.

Figure 17:
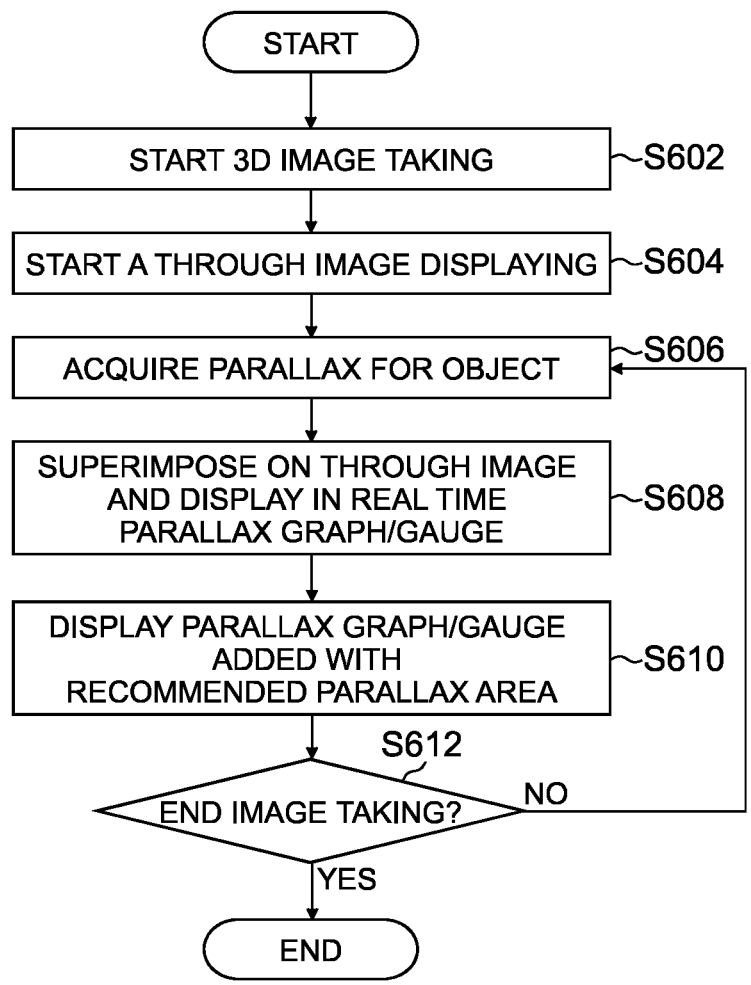
FIG. 17 is a flowchart illustrating an image processing example in the sixth embodiment.

FIG. 17 is a flowchart illustrating an example of the image-taking processing (image processing) performed by the controller 50 in the sixth embodiment.

In FIG. 17, steps S602 to S608 are similar to steps S102 to S108 in the image processing shown in FIG. 7 in the first embodiment, and a description thereof is omitted.

At step S610, the parallax history information generator 42 generates the parallax graph 80 presenting the recommended parallax area 80A as well as the parallax gauge generator 44 generates the parallax gauge 90 presenting the recommended parallax area 90A. Then, the superimposition unit 46 superimposes the generated parallax graph 80 and parallax gauge 90 on the through image to display the through image on the display unit 16.

According to the embodiment, the 3D imaging or 3D reproduction-displaying can be performed while the parallax graph and parallax gauge added with the recommended parallax amount range information are viewed. This allows even a beginner unfamiliar with the 3D imaging or 3D reproduction-displaying to easily enjoy 3D imaging or 3D reproduction-displaying which is harmless to health.

Seventh Embodiment

In a seventh embodiment, the parallax history information generator 42 and the parallax gauge generator 44 respectively generate the parallax graph (parallax history information) and parallax gauge which present a parallax range unsuitable to stereoscopic viewing (abnormal parallax area). Note that a description is omitted below of the content already described in the first embodiment to the sixth embodiment.

Figure 18:
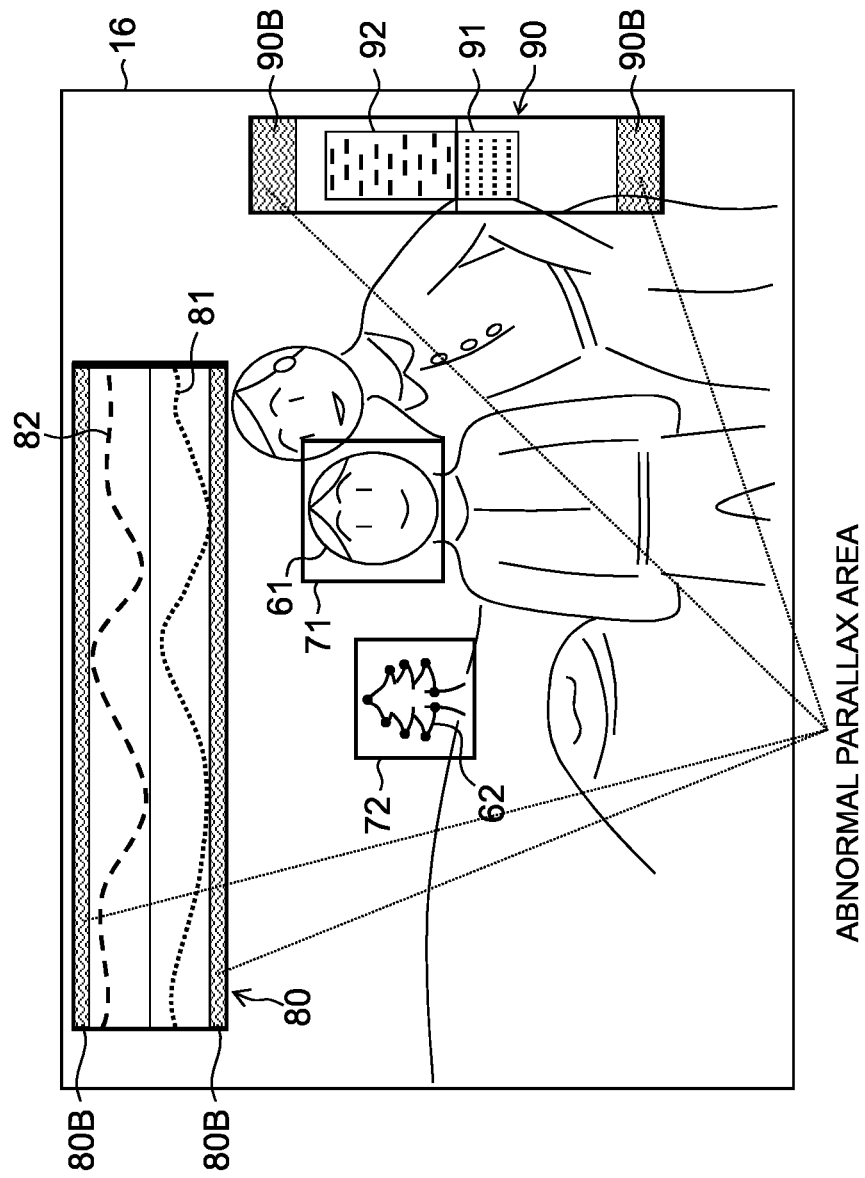
FIG. 18 is an explanatory diagram illustrating a display example of a moving image in a seventh embodiment.

FIG. 18 is an explanatory diagram illustrating an example of the moving image which is subjected to stereoscopic viewing-display on the display unit 16 in the seventh embodiment. In FIG. 18, the parallax graph 80 and parallax gauge 90 respectively have the abnormal parallax areas 80B and 90B displayed thereon.

Figure 19:
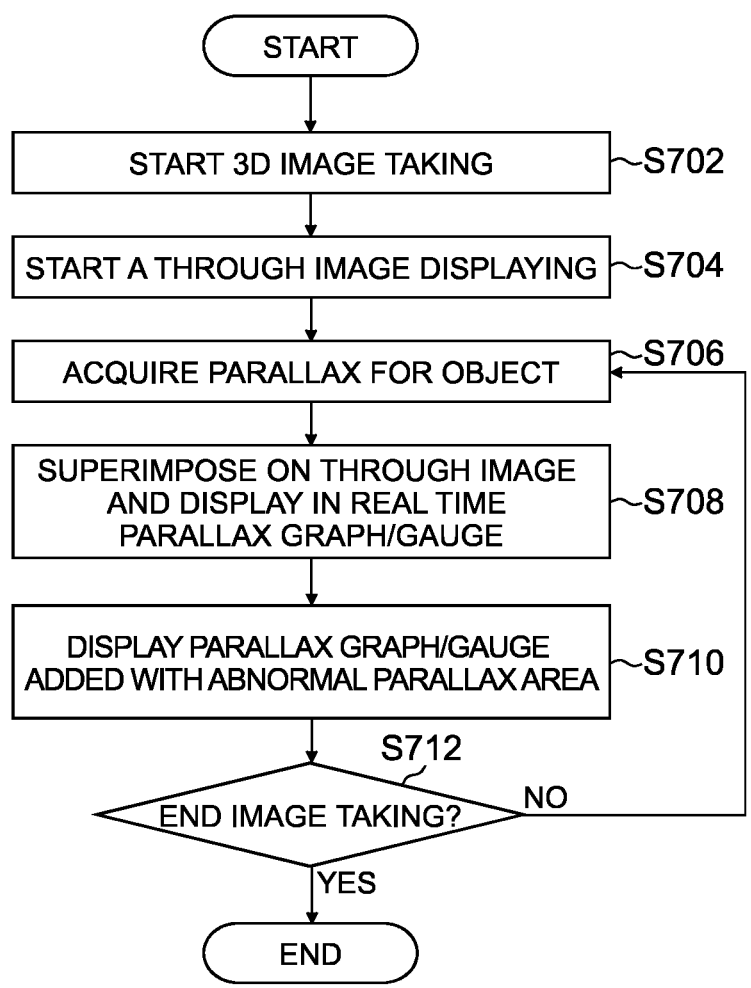
FIG. 19 is a flowchart illustrating an image processing example in the seventh embodiment.

FIG. 19 is a flowchart illustrating an example of the image-taking processing (image processing) performed by the controller 50 in the seventh embodiment.

In FIG. 19, steps S702 to S708 are similar to steps S102 to S108 in the image processing shown in FIG. 7 in the first embodiment, and a description thereof is omitted.

At step S710, the parallax history information generator 42 generates the parallax graph 80 presenting the abnormal parallax area 80B as well as the parallax gauge generator 44 generates the parallax gauge 90 presenting the abnormal parallax area 90B. Then, the superimposition unit 46 superimposes the generated parallax graph 80 and parallax gauge 90 on the through image to display the through image on the display unit 16.

According to the embodiment, the 3D imaging or 3D reproduction-displaying can be performed while the parallax graph and parallax gauge added with abnormal parallax amount information are viewed. This allows to lead a user to not perform the 3D imaging or 3D reproduction-displaying in the parallax range unsuitable to stereoscopic viewing even if the user is a beginner unfamiliar with the 3D imaging or 3D reproduction-displaying. This can prevent even the user as a beginner from feeling discomfort due to the stereoscopic image display.

The description is given as above of, as an example of the image processing device in the present invention, a stereoscopic imaging device which takes a moving image (3D moving image) that is stereoscopically viewable, but the present invention is not limited to the stereoscopic imaging device. For example, the present invention can be applied to a stereoscopic reproduction-display device which reproduction-displays the moving image (3D moving image) that is stereoscopically viewable.

Figure 20:
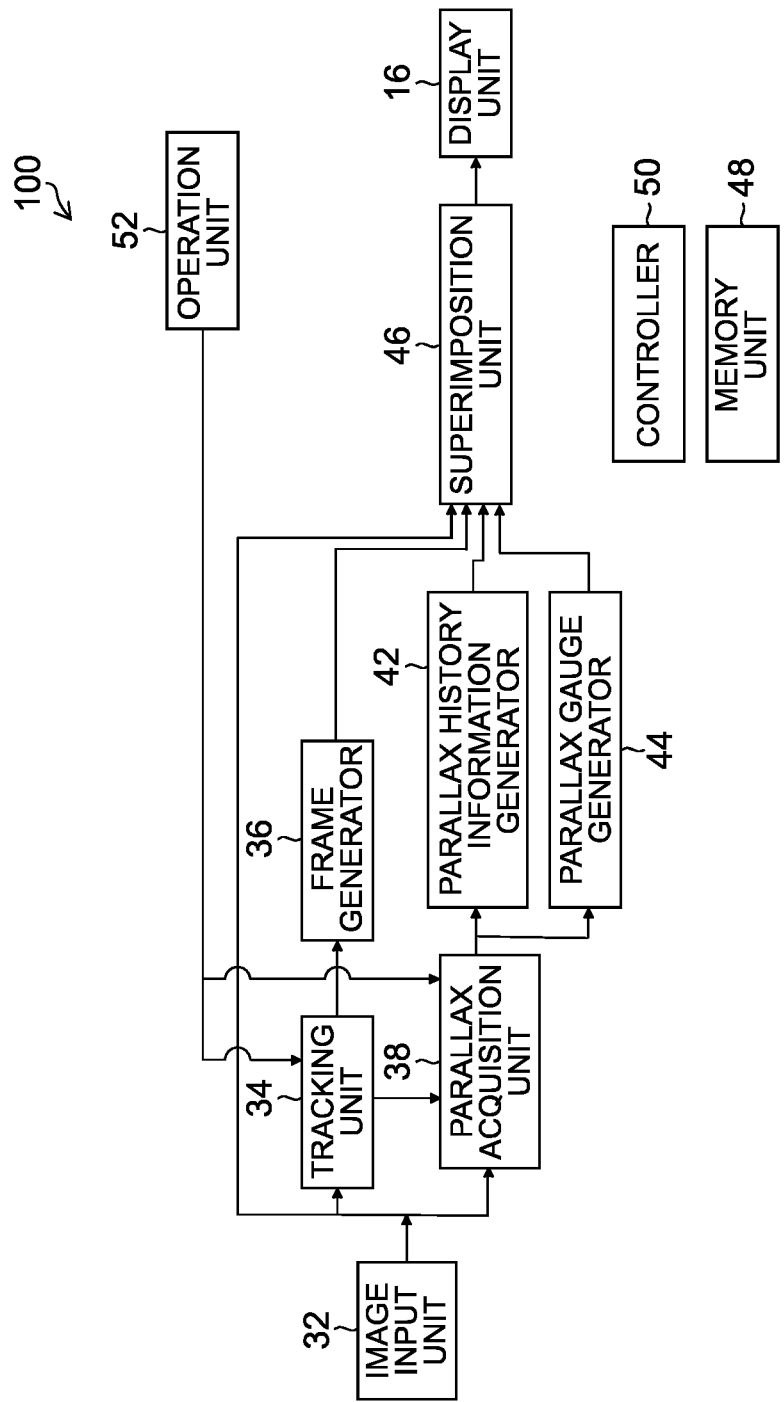
FIG. 20 is a block diagram illustrating a general configuration example of a stereoscopic image reproduction display device to which the present invention is applied.

FIG. 20 is a block diagram illustrating a general configuration example of a stereoscopic image reproduction display device to which the present invention is applied. In FIG. 20, components the same as those of the stereoscopic imaging device 1 in FIG. 3 are designated by the same reference numerals. Note that a description is omitted of the components the same as those of the stereoscopic imaging device 1 in FIG. 1 to FIG. 3.

A stereoscopic image reproduction display device 100 in FIG. 20 includes an image input unit 32 with which the moving image can be input in place of the imaging units 12 and 13 in FIG. 3.

Examples of the image input unit 32 in FIG. 20 include a memory medium interface device for inputting the moving image from a memory medium such as a memory card, and a communication interface device for inputting the moving image by way of a communication via an electric communication line or the like.

Note that the description is given above of the case where the moving image including plural viewpoint images is three-dimensionally displayed (stereoscopically viewing-displayed) on the display unit 16, but the present invention can also be applied to a case where the moving image is two-dimensionally displayed (plane-displayed). In other words, the image processing device according to the present invention includes a device which can only two-dimensionally display the moving image including plural viewpoint images (e.g., imaging device, display device).

Note that the scope of the present invention includes a program for causing a processor of a computer device to execute the above image processing method, and a computer-readable non-transitory recording medium and computer program product which store the program.

The present invention is not limited to the examples described in this Description or the examples illustrated in the drawings, and of course various design change or modification may be made without departing from the scope of the present invention.

What is claimed is:

1. An image processing device comprising:
    an image acquisition unit that acquires a moving image including plural viewpoint images continuously taken;
    a display unit that displays the moving image acquired by the image acquisition unit;
    a selection unit that selects a specific subject image from the moving image acquired by the image acquisition unit;
    a parallax acquisition unit that continuously acquires a parallax for the specific subject image selected by the selection unit from the plural viewpoint images of the moving image;
    a parallax history information generator that generates continuously parallax history information on the basis of the parallax acquired by the parallax acquisition unit, the parallax history information indicating variation with time of the parallax for the specific subject image and including a current parallax for the specific subject image, wherein the parallex history information includes a graph illustrating the variation with the time of the parallax for the specific subject image; and
    a controller that displays on the display unit the plural viewpoint images of the moving image acquired by the image acquisition unit together with the parallax history information generated by the parallax history information generator, the controller making the display cycle of displaying the parallax history longer than the cycle of acquiring the parallax by the parallax acquisition unit.

2. The image processing device according to claim 1 wherein said graph generated by said
    parallax history information indicates parallax variation of the specific subject image using a line having a color or pattern which is the same as the mark for each specific subject image.

3. The image processing device according to claim 1 further comprising
    a tracking unit that tracks the specific subject image in the moving image, wherein
    the parallax acquisition unit acquires the parallax for the specific subject image in the moving image tracked by the tracking unit.

4. The image processing device according to claim 1 wherein the parallax history information generator generates the parallax history information presenting a parallax range suitable to stereoscopic viewing.

5. The image processing device according to claim 1 wherein the parallax history information generator generates the parallax history information presenting a parallax range unsuitable to stereoscopic viewing.

6. The image processing device according to claim 1 wherein
    in a case where the selection unit selects a plurality of the specific subject images, the parallax history information generator generates the parallax history information for the nearest subject image or the farthest subject image among the plurality of specific subject images, or for both these subject images.

7. An image processing method performed by use of an image acquisition unit that acquires a moving image including plural viewpoint images continuously taken and a display unit that displays the moving image acquired by the image acquisition unit, the method comprising:
    a step of selecting a specific subject image from the moving image acquired by the image acquisition unit;
    a parallax acquisition step of continuously acquiring a parallax for the selected specific subject image from the plural viewpoint images of the moving image;
    a parallax history information generation step of continuously generating parallax history information on the basis of the parallax acquired in the parallax acquisition step, the parallax history information indicating variation with time of the parallax for the specific subject image and including a current parallax for the specific subject image, wherein the parallex history information includes a graph illustrating the variation with the time of the parallax for the specific subject image; and a display step of displaying on the display unit the plural viewpoint images of the moving image acquired by the image acquisition unit together with the parallax history information generated in the parallax history information generation step and making the display cycle of displaying the parallax history longer than the cycle of acquiring the parallax by the parallax acquisition step.

8. A non-transitory computer-readable recording medium, when an instruction stored in the recording medium is read by a processor, the processor executes:

a step of selecting a specific subject image from the moving image acquired by an image acquisition unit that acquires a moving image including plural viewpoint images continuously taken;

a parallax acquisition step of continuously acquiring a parallax for the selected specific subject image from the plural viewpoint images of the moving image;

a parallax history information generation step of continuously generating parallax history information on the basis of the parallax acquired in the parallax acquisition step, the parallax history information indicating variation with time of the parallax for the specific subject image and including a current parallax for the specific subject image, wherein the parallex history information includes a graph illustrating the variation with the time of the parallax for the specific subject image; and a display step of displaying on a display unit the plural viewpoint images of the moving image acquired by the image acquisition unit together with the parallax history information generated in the parallax history information generation step and making the display cycle of displaying the parallax history longer than the cycle of acquiring the parallax by the parallax acquisition step.

* * * * *